(12) United States Patent
Nagasaka et al.

(10) Patent No.: US 10,425,983 B2
(45) Date of Patent: Sep. 24, 2019

(54) RADIO TERMINAL AND BASE STATION FOR WWAN-WLAN AGGREGATION COMMUNICATION

(71) Applicant: KYOCERA CORPORATION, Kyoto-shi, Kyoto (JP)

(72) Inventors: Yushi Nagasaka, Ritto (JP); Kugo Morita, Higashiomi (JP); Masato Fujishiro, Yokohama (JP); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/695,165

(22) Filed: Sep. 5, 2017

(65) Prior Publication Data

US 2017/0367141 A1 Dec. 21, 2017

Related U.S. Application Data

(63) Continuation of application No. PCT/JP2016/055886, filed on Feb. 26, 2016.

(Continued)

(30) Foreign Application Priority Data

Mar. 6, 2015 (JP) .................................. 2015-044890

(51) Int. Cl.
*H04W 76/16* (2018.01)
*H04W 8/24* (2009.01)
(Continued)

(52) U.S. Cl.
CPC .............. *H04W 76/16* (2018.02); *H04W 8/24* (2013.01); *H04W 84/045* (2013.01); *H04W 84/12* (2013.01)

(58) Field of Classification Search
CPC ..... H04W 76/16; H04W 8/24; H04W 84/045; H04W 84/12
See application file for complete search history.

(56) References Cited

U.S. PATENT DOCUMENTS

| 9,706,423 | B2* | 7/2017 | Horn | H04W 24/10 |
| 2013/0242897 | A1* | 9/2013 | Meylan | H04W 28/16 |
| | | | | 370/329 |
| 2016/0149686 | A1* | 5/2016 | Tsai | H04L 5/0055 |
| | | | | 370/329 |

FOREIGN PATENT DOCUMENTS

| JP | 2014-171007 A | 9/2014 |
| WO | 2013/138708 A1 | 9/2013 |

(Continued)

OTHER PUBLICATIONS

Extended European Search Report issued for the corresponding European Patent Application No. 16761531.9, dated Dec. 6, 2017.

(Continued)

*Primary Examiner* — Christopher M Crutchfield
*Assistant Examiner* — Tito Q Pham

(57) ABSTRACT

A base station in a system supporting WWAN-WLAN aggregation communication in which a radio terminal performs communication using WWAN communication and WLAN communication simultaneously. The base station includes a controller configured to acquire capability information indicating a function of the radio terminal, wherein a first function and a second function are defined. The first function splits a bearer of the radio terminal in a PDCP layer of the WWAN communication, and uses the WWAN communication and the WLAN communication for radio communication of the bearer. The second function uses only the WLAN communication for the radio communication of the bearer without splitting the bearer going through the PDCP layer. The controller is configured to acquire capability information of the second function as information different from capability information of the first function.

6 Claims, 34 Drawing Sheets

Related U.S. Application Data

(60) Provisional application No. 62/145,808, filed on Apr. 10, 2015.

(51) Int. Cl.
  *H04W 84/04* (2009.01)
  *H04W 84/12* (2009.01)

(56) References Cited

FOREIGN PATENT DOCUMENTS

| WO | 2013/138711 A1 | 9/2013 |
| WO | 2013/161135 A1 | 10/2013 |
| WO | 2014/168426 A1 | 10/2014 |
| WO | 2015/002404 A1 | 1/2015 |

OTHER PUBLICATIONS

CATT, "UP Protocol Architecture Design", 3GPP TSG RAN WG2 Meeting #83, R2-132496, Aug. 19-23, 2013, Barcelona, Spain.

Kyocera, "Scenario and Protocol Architecture of LTE-WLAN Aggregation", 3GPP TSG-RAN WG2 #89-bis, R2-151538, Apr. 20-24, 2015, Bratislava, Slovakia.

Intel Corporation & Qualcomm Incorporated, "New SI Proposal: LTE-WLAN Radio Level Integration", 3GPP TSG RAN Meeting #66, 3GPP RP-142281, Maui, USA, Dec. 8-11, 2014.

Intel Corporation, China Telecom, & Qualcomm Incorporated, "New SI Proposal: LTE-WLAN Radio Level Integration and intervorking enhancement", 3GPP TSG RAN Meeting #67, 3GPP RP-150262, Shanghai, China, Mar. 9-12, 2015.

Yoshiaki Ohta, et al. "Proposal of Link Layer Structure for LTE-WLAN Aggregation in LTE-Advanced/5G Network"; IEICE Technical Report, vol. 114, No. 477, Feb. 23, 2015, p. 133-138.

International Search Report (Form PCT/ISA/210) dated May 24, 2016, issued for PCT/JP2016/055886.

Ericsson, "Architecture Options for LTE-WLAN Radio Level Integration", 3GPP RP-150307, 3GPP TSG-RAN#67, Shanghai, China, Mar. 2015, 3 pages.

* cited by examiner

| Bit | Description |
|---|---|
| 000 | PDCP status report |
| 001 | Interspersed ROHC feedback packet |
| 010 | ulDataPath |
| 011- | reserved |

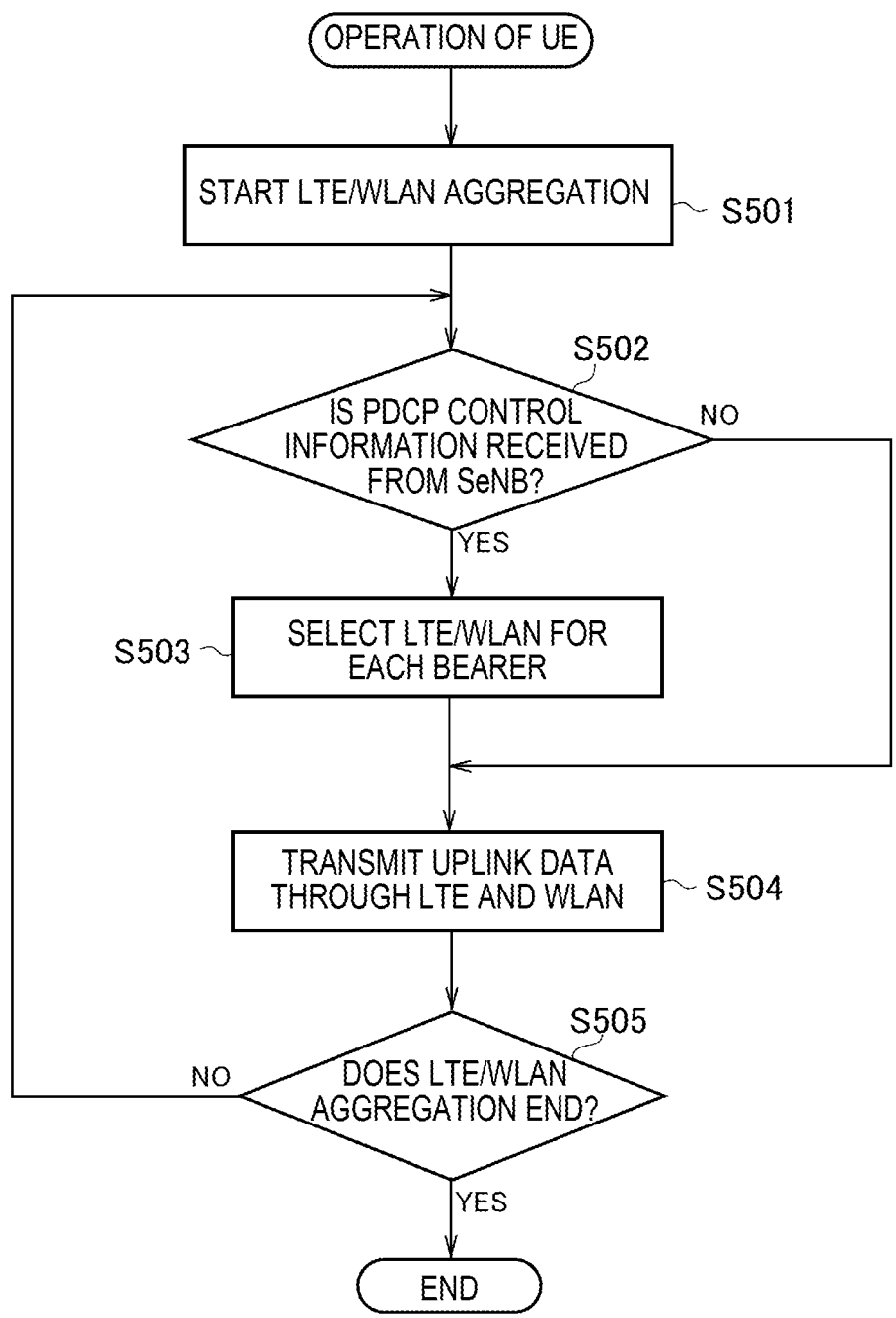

Option 3C (FIRST FUNCTION)

Option 2C (SECOND FUNCTION)

Alternative 2C (Left) and 3C (Right)

FIG. 35

Statement in RRC specification

5.6.12.2 Dedicated WLAN offload configuration

The UE shall:

1> if the received *wlan-OffloadDedicated* is set to *release*:

2> release *wlan-OffloadDedicated* and inform upper layers about the release;

2> if the *wlan-OffloadConfigCommon* corresponding to the RPLMN is broadcast by the cell:

3> apply the *wlan-OffloadConfigCommon* corresponding to the RPLMN included in *SystemInformationBlockType17*;

3> forward the *wlan-OffloadConfigCommon* corresponding to the RPLMN to upper layer;

1> else:

2> if the received *wlan-OffloadDedicated* includes *thresholdRSRP*:

3> apply the received *thresholdRSRP*;

3> forward the received *thresholdRSRP* to upper layers;

...

Statement in Idle mode specification

The upper layers in the UE shall be notified (see TS 24.302 [28]) when and for which WLAN(s), that matches all the provided identifiers (in subclause 5.6.3) for a specific entry in the list, the following conditions 1 and 2 for steering traffic from E-UTRAN to WLAN are satisfied for a time interval $Tsteering_{WLAN}$:

1. In the E-UTRAN serving cell:

$RSRPmeas < Thresh_{ServingOffloadWLAN, LowP}$; or
   $RSRQmeas < Thresh_{ServingOffloadWLAN, LowQ}$;

2. In the target WLAN:

$ChannelUtilizationWLAN < Thresh_{ChUtilWLAN, Low}$; and
   $BackhaulRateDlWLAN > Thresh_{BackhRateDLWLAN, High}$; and
   $BackhaulRateUlWLAN > Thresh_{BackhRateULWLAN, High}$; and
   $BeaconRSSI > Thresh_{BeaconRSSIWLAN, High}$;

...

RADIO TERMINAL AND BASE STATION FOR WWAN-WLAN AGGREGATION COMMUNICATION

RELATED APPLICATION

This application is a continuation application of international application PCT/JP2016/055886, filed Feb. 26, 2016, which claims the benefit of Japanese Patent Application No. 2015-044890 filed Mar. 6, 2015 and U.S. Provisional Application No. 62/145,808 filed Apr. 10, 2015, the entire contents of which are incorporated herein by reference.

TECHNICAL FIELD

The present disclosure relates to a radio terminal and a base station which are used in a mobile communication system.

BACKGROUND

In 3rd Generation Partnership Project (3GPP) which is a mobile communication system standardization project, standardization of an interworking technique of supporting interworking between Long Term Evolution (LTE) communication which is a wireless wide area network (WWAN) technique and wireless local area network (WLAN) communication is in progress.

In a currently standardized interworking technique, a radio terminal switches a connection destination or a standby destination between a base station and a WLAN node on the basis of control information received from the base station.

A technique of performing transmission and reception of data using WWAN communication and WLAN communication simultaneously in order to enhance the interworking technique is under review (for example, see Non Patent Literature 1). This technique is referred to as WWAN-WLAN aggregation (LTE-WLAN aggregation).

SUMMARY

A radio terminal according to a first aspect is capable of performing WWAN-WLAN aggregation communication using WWAN communication and WLAN communication simultaneously. The radio terminal includes a transmitter configured to transmit WLAN measurement information related to a measurement result for the WLAN communication, to a specific base station through the WWAN communication while the WWAN-WLAN aggregation communication is being performed.

A base station according to a second aspect is provided in a network supporting a WWAN-WLAN aggregation communication of performing communication with a radio terminal using WWAN communication and the WLAN communication simultaneously. The base station includes a receiver configured to receive WLAN measurement information related to a measurement result for the WLAN communication from the radio terminal through the WWAN communication while the WWAN-WLAN aggregation communication is being executed.

A base station according to a third aspect is provided in a network supporting a WWAN-WLAN aggregation communication of performing communication with a radio terminal using WWAN communication and the WLAN communication simultaneously. The base station includes: a WLAN communication unit configured to acquire the WLAN measurement information related to the measurement result for the WLAN communication while the WWAN-WLAN aggregation communication is being performed; and a controller configured to control the WWAN-WLAN aggregation communication on the basis of the WLAN measurement information.

A base station according to a fourth aspect is provided in a network supporting a WWAN-WLAN aggregation communication of performing communication with a radio terminal using WWAN communication and the WLAN communication simultaneously. The base station includes a controller configured to acquire, from a WLAN node, the WLAN measurement information related to the measurement result for the WLAN communication while the WWAN-WLAN aggregation communication is being performed. The controller is configured to control the WWAN-WLAN aggregation communication on the basis of the WLAN measurement information.

A radio terminal according to a fifth aspect is capable of performing WWAN-WLAN aggregation communication using WWAN communication and WLAN communication simultaneously. The radio terminal includes: a controller configured to select a first bearer in which the WWAN communication is applied to uplink data transmission and a second bearer in which the WLAN communication is applied to the uplink data transmission; and a transmitter configured to transmit uplink data of the first bearer through the WWAN communication, and transmit uplink data of the second bearer through the WLAN communication.

A base station according to a sixth aspect receives downlink data transferred from another base station through one of two bearers obtained by splitting a bearer of a radio terminal through the another base station. The base station includes: a controller configured to select first downlink data to be transmitted to the radio terminal through WWAN communication and second downlink data to be transmitted to the radio terminal through WLAN communication, from the downlink data transferred from the another base station through the one bearer; a WWAN communication unit configured to transmit the first downlink data to the radio terminal through the WWAN communication; and a WLAN communication unit configured to transmit the second downlink data to the radio terminal through the WLAN communication.

A base station according to a seventh aspect has a direct interface with another base station and a direct interface with a WLAN node. The base station includes: a data transfer unit configured to split each of a first bearer and a second bearer of a radio terminal into two, transfer downlink data to the another base station through one split bearer of the first bearer, and transfer downlink data to the WLAN node through one split bearer of the second bearer; and a data transmitter configured to transmit downlink data to the radio terminal through another split bearer of the first bearer, and transmit the downlink data to the radio terminal through another split bearer of the second bearer.

A base station according to an eighth aspect has a direct interface with another base station and a direct interface with a WLAN node. The base station includes: a data transfer unit configured to divide one bearer of a radio terminal into two and transfer downlink data to the another base station through one split bearer of the one bearer; a data transmitter configured to transmit downlink data to the radio terminal through another split bearer of the one bearer; a controller configured to construct a new split bearer of the one bearer with the WLAN node, and release the one split bearer. The data transfer unit is configured to stop data transfer to the another base station, and transfer downlink data to the WLAN node through the new split bearer.

A base station according to a ninth aspect is a base station in a system supporting WWAN-WLAN aggregation communication in which a radio terminal performs communication using WWAN communication and WLAN communication simultaneously. The base station includes a controller configured to acquire capability information indicating a function of the radio terminal, wherein a first function and a second function are defined. The first function splits a bearer of the radio terminal in a PDCP layer of the WWAN communication, and uses the WWAN communication and the WLAN communication for radio communication of the bearer. The second function uses only the WLAN communication for the radio communication of the bearer without splitting the bearer going through the PDCP layer. The controller is configured to acquire capability information of the second function as information different from capability information of the first function.

A radio terminal according to a tenth aspect is capable of performing WWAN-WLAN aggregation communication of performing communication using WWAN communication and WLAN communication simultaneously. The radio terminal includes: a controller configured to notify a base station of capability information indicating a function of the radio terminal, wherein a first function and a second function are defined. The first function splits a bearer of the radio terminal in a PDCP layer of the WWAN communication, and uses the WWAN communication and the WLAN communication for radio communication of the bearer. The second function uses only the WLAN communication for the radio communication of the bearer without splitting the bearer going through the PDCP layer. The controller is configured to notify of capability information of the second function as information different from capability information of the first function.

A wireless communication apparatus according to an eleventh embodiment is an apparatus in a system supporting WWAN-WLAN aggregation communication of performing communication using WWAN communication and WLAN communication simultaneously. The wireless communication apparatus includes a controller, wherein in a case in which data is transferred from a PDCP layer of the WWAN communication to a WLAN communication entity, the controller is configured to perform control of compensating a function of the WLAN communication entity so that a function expected in a WWAN lower layer lower than the PDCP layer is provided to the PDCP layer.

BRIEF DESCRIPTION OF DRAWINGS

FIG. 17 is a flowchart illustrating an example of operation flow of a UE according to the fifth embodiment.

FIG. 35 is a diagram relating to an additional note.

DETAILED DESCRIPTION

Overview of Embodiments

Figure 1:
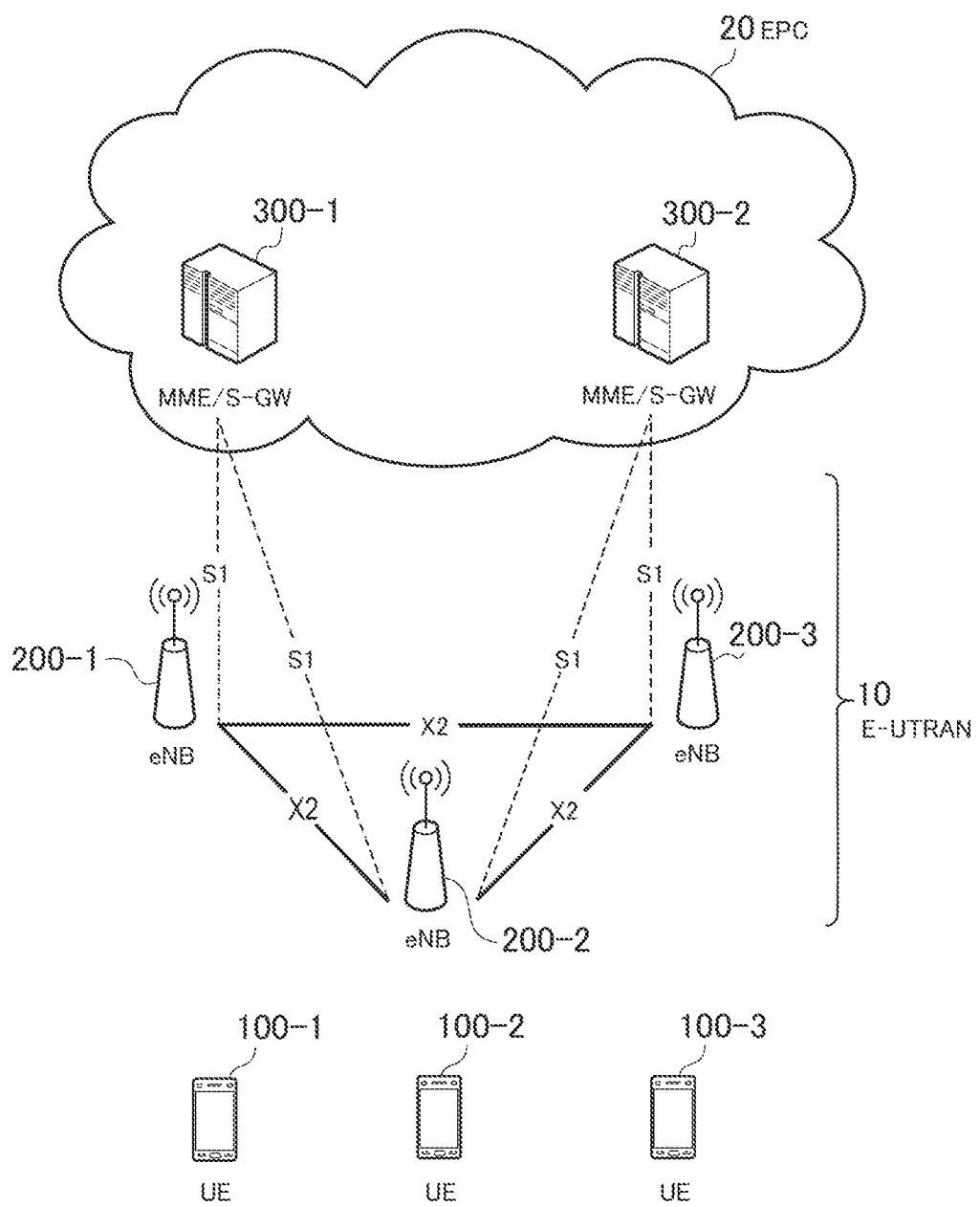
FIG. 1 is a diagram illustrating a configuration of an LTE system (mobile communication system) according to first to tenth embodiments.

It is an object of these embodiments to implement efficient communication through WWAN-WLAN aggregation (or an advanced interworking technique).

A radio terminal according to a first embodiment is capable of performing WWAN-WLAN aggregation communication using WWAN communication and WLAN communication simultaneously. The radio terminal includes a transmitter configured to transmit WLAN measurement information related to a measurement result for the WLAN communication, to a specific base station through the WWAN communication while the WWAN-WLAN aggregation communication is being performed.

In the first embodiment, the specific base station is a base station that controls at least one of releasing, modifying, and deactivating of a configuration of the WWAN-WLAN aggregation communication in the radio terminal.

In the first embodiment, the WWAN communication is dual connectivity communication using dual connectivity with a master base station and a secondary base station. The specific base station is the master base station.

In the second embodiment, the specific base station is a base station that splits one bearer of the radio terminal into a first bearer for the WWAN communication and a second bearer for the WLAN communication, and performs data allocation between the first bearer and the second bearer.

In the second embodiment, the WWAN communication is dual connectivity communication using dual connectivity with a master base station and a secondary base station. The specific base station is the master base station or the secondary base station.

In the first and second embodiments, the transmitter is configured to transmit the WLAN measurement information to the specific base station through physical layer signaling specified in a physical layer specification of the WWAN communication.

In a modification of the first embodiment, the transmitter is configured to transmit the WLAN measurement information to the specific base station through RRC signaling specified in an RRC layer specification of the WWAN communication.

In the first and second embodiments, the WLAN measurement information includes a WLAN channel quality parameter.

In the first and second embodiments, the WLAN measurement information includes a WLAN congestion parameter.

A base station according to the first and second embodiments is provided in a network supporting a WWAN-WLAN aggregation communication of performing communication with a radio terminal using WWAN communication and the WLAN communication simultaneously. The base station includes a receiver configured to receive WLAN measurement information related to a measurement result for the WLAN communication from the radio terminal through the WWAN communication while the WWAN-WLAN aggregation communication is being executed.

In the first embodiment, the base station includes a controller configured to control at least one of releasing, modifying, and deactivating of a configuration of the WWAN-WLAN aggregation communication in the radio terminal on the basis of the WLAN measurement information.

In the second embodiment, the base station includes a controller configured to split one bearer of the radio terminal into a first bearer for the WWAN communication and a second bearer for the WLAN communication, and perform data allocation between the first bearer and the second bearer on the basis of the WLAN measurement information.

A base station according to a third embodiment is provided in a network supporting a WWAN-WLAN aggregation communication of performing communication with a radio terminal using WWAN communication and the WLAN communication simultaneously. The base station includes: a WLAN communication unit configured to acquire the WLAN measurement information related to the measurement result for the WLAN communication while the WWAN-WLAN aggregation communication is being performed; and a controller configured to control the WWAN-WLAN aggregation communication on the basis of the WLAN measurement information.

In the third embodiment, the controller is configured to control at least one of releasing, modifying, and deactivating of a configuration of the WWAN-WLAN aggregation communication in the radio terminal on the basis of the WLAN measurement information.

In the third embodiment, the controller is configured to split one bearer of the radio terminal into a first bearer for the WWAN communication and a second bearer for the WLAN communication, and perform data allocation between the first bearer and the second bearer on the basis of the WLAN measurement information.

A base station according to a fourth embodiment is provided in a network supporting a WWAN-WLAN aggregation communication of performing communication with a radio terminal using WWAN communication and the WLAN communication simultaneously. The base station includes a controller configured to acquire, from a WLAN node, the WLAN measurement information related to the measurement result for the WLAN communication while the WWAN-WLAN aggregation communication is being performed. The controller is configured to control the WWAN-WLAN aggregation communication on the basis of the WLAN measurement information.

In the fourth embodiment, the controller is configured to control at least one of releasing, modifying, and deactivating of a configuration of the WWAN-WLAN aggregation communication in the radio terminal on the basis of the WLAN measurement information.

In the fourth embodiment, the controller is configured to split one bearer of the radio terminal into a first bearer for the WWAN communication and a second bearer for the WLAN communication, and perform data allocation between the first bearer and the second bearer on the basis of the WLAN measurement information.

A radio terminal according to a fifth embodiment is capable of performing WWAN-WLAN aggregation communication using WWAN communication and WLAN communication simultaneously. The radio terminal includes: a controller configured to select a first bearer in which the WWAN communication is applied to uplink data transmission and a second bearer in which the WLAN communication is applied to the uplink data transmission; and a transmitter configured to transmit uplink data of the first bearer through the WWAN communication, and transmit uplink data of the second bearer through the WLAN communication.

In the fifth embodiment, the radio terminal further includes a receiver configured to receive control information indicating whether the WWAN communication or the WLAN communication is applied to a bearer of the radio terminal, from a specific base station through the WWAN communication. The controller is configured to select the first bearer and the second bearer in accordance with the control information.

In the fifth embodiment, the receiver is configured to receive the control information from the specific base station through PDCP layer signaling specified in a PDCP layer specification of the WWAN communication.

In the fifth embodiment, the WWAN communication is dual connectivity communication using dual connectivity with a master base station and a secondary base station. The specific base station is the secondary base station.

In the fifth embodiment, the controller is configured to select the first bearer and the second bearer regardless of the control information from the base station.

A base station according to a sixth embodiment receives downlink data transferred from another base station through one of two bearers obtained by splitting a bearer of a radio terminal through the another base station. The base station includes: a controller configured to select first downlink data to be transmitted to the radio terminal through WWAN communication and second downlink data to be transmitted to the radio terminal through WLAN communication, from the downlink data transferred from the another base station through the one bearer; a WWAN communication unit configured to transmit the first downlink data to the radio terminal through the WWAN communication; and a WLAN communication unit configured to transmit the second downlink data to the radio terminal through the WLAN communication.

In the sixth embodiment, the controller is configured to autonomously select the first downlink data and the second downlink data regardless of the control information from the another base station.

In the sixth embodiment, the controller is configured to autonomously select the first downlink data and the second downlink data on the basis of a channel state of the WLAN communication.

In the sixth embodiment, the controller is configured to notify the another base station of a sum of a buffer accumulation amount of the first downlink data and a buffer accumulation amount of the second downlink data.

In the sixth embodiment, the controller is configured to select the first downlink data and the second downlink data on the basis of the control information from the another base station. The controller is configured to notify the another base station of a buffer accumulation amount of the first downlink data and a buffer accumulation amount of the second downlink data individually.

In the sixth embodiment, the controller is configured to notify the another base station of information related to a data amount transferable from the another base station to the base station in a case in which the WLAN communication is deactivated or activated.

A base station according to a seventh embodiment has a direct interface with another base station and a direct interface with a WLAN node. The base station includes: a data transfer unit configured to split each of a first bearer and a second bearer of a radio terminal into two, transfer downlink data to the another base station through one split bearer of the first bearer, and transfer downlink data to the WLAN node through one split bearer of the second bearer; and a data transmitter configured to transmit downlink data to the radio terminal through another split bearer of the first bearer, and transmit the downlink data to the radio terminal through another split bearer of the second bearer.

A base station according to an eighth embodiment has a direct interface with another base station and a direct interface with a WLAN node. The base station includes: a data transfer unit configured to divide one bearer of a radio terminal into two and transfer downlink data to the another base station through one split bearer of the one bearer; a data transmitter configured to transmit downlink data to the radio terminal through another split bearer of the one bearer; a controller configured to construct a new split bearer of the one bearer with the WLAN node, and release the one split bearer. The data transfer unit is configured to stop data transfer to the another base station, and transfer downlink data to the WLAN node through the new split bearer.

A base station according to a ninth embodiment is a base station in a system supporting WWAN-WLAN aggregation communication in which a radio terminal performs communication using WWAN communication and WLAN communication simultaneously. The base station includes a controller configured to acquire capability information indicating a function of the radio terminal, wherein a first function and a second function are defined. The first function splits a bearer of the radio terminal in a PDCP layer of the WWAN communication, and uses the WWAN communication and the WLAN communication for radio communication of the bearer. The second function uses only the WLAN communication for the radio communication of the bearer without splitting the bearer going through the PDCP layer. The controller is configured to acquire capability information of the second function as information different from capability information of the first function.

In the ninth embodiment, an acknowledged mode and an unacknowledged mode are allowed in a bearer in which the second function is configured. Only the acknowledged mode is allowed in a bearer in which the first function is configured.

In the ninth embodiment, the controller is configured to configure, in the radio terminal having both the first function and the second function, both the bearer in which the first function is configured and the bearer in which the second function is configured.

In the ninth embodiment, the controller is configured to perform a process of transmitting change information for changing a configuration of the bearer between the first function and the second function, to the radio terminal having both the first function and the second function.

In the ninth embodiment, in a case in which the configuration of the bearer is changed from the second function to the first function, the controller is configured to perform a process of transmitting configuration information for the first function together with the change information.

A radio terminal according to a ninth embodiment is capable of performing WWAN-WLAN aggregation communication of performing communication using WWAN communication and WLAN communication simultaneously. The radio terminal includes: a controller configured to notify a base station of capability information indicating a function of the radio terminal, wherein a first function and a second function are defined. The first function splits a bearer of the radio terminal in a PDCP layer of the WWAN communication, and uses the WWAN communication and the WLAN communication for radio communication of the bearer. The second function uses only the WLAN communication for the radio communication of the bearer without splitting the bearer going through the PDCP layer. The controller is configured to notify of capability information of the second function as information different from capability information of the first function.

A wireless communication apparatus according to a tenth embodiment is an apparatus in a system supporting WWAN-WLAN aggregation communication of performing communication using WWAN communication and WLAN communication simultaneously. The wireless communication apparatus includes a controller, wherein in a case in which data is transferred from a PDCP layer of the WWAN communication to a WLAN communication entity, the controller is configured to perform control of compensating a function of the WLAN communication entity so that a function expected in a WWAN lower layer lower than the PDCP layer is provided to the PDCP layer.

In the tenth embodiment, the WLAN communication entity is configured to perform a process of transmitting the data transferred from the PDCP layer through the WLAN communication. The controller is configured to monitor a data transmission state in the WLAN communication entity, and provide the PDCP layer with a transmission completion notification interpretable by the PDCP layer.

In the tenth embodiment, in a case in which data of a bearer in which an unacknowledged mode in the WWAN communication is configured is transferred from the PDCP layer to the WLAN communication entity, the controller is configured to operate the WLAN communication entity in an unacknowledged mode in the WLAN communication.

In the tenth embodiment, in a case in which an instruction to re-establish the WLAN communication is given from an RRC layer of the WWAN communication, the controller is configured to perform at least one of: discarding of the data held in the WLAN communication entity; and initialization of a parameter configured in the WLAN communication entity.

In the tenth embodiment, the controller is configured to operate the WLAN communication entity so that a duplicate data discarding operation in the WLAN communication is performed.

In the tenth embodiment, the radio communication apparatus is a base station having the PDCP layer. The WLAN communication entity is provided in the base station or a WLAN node.

In the tenth embodiment, the radio communication apparatus is a WLAN node having the WLAN communication entity.

In the tenth embodiment, the radio communication apparatus is a radio terminal having the PDCP layer and the WLAN communication entity.

[Mobile Communication System]

Hereinafter, an LTE system which is a mobile communication system according to first to tenth embodiments will be described.

(Overview of Mobile Communication System)

FIG. 1 is a diagram illustrating a configuration of an LTE system (mobile communication system) according to the first to tenth embodiments. The LTE system includes a plurality of user equipments (UEs) 100, an evolved-UMTS terrestrial radio access network (E-UTRAN) 10, and an evolved packet core (EPC) 20 as illustrated in FIG. 1.

The UE 100 corresponds to a radio terminal. The UE 100 is a mobile communication apparatus and performs radio communication with a serving cell. In the first to tenth embodiments, the UE 100 supports both communication schemes of LTE communication (WWAN communication) and WLAN communication. Configuration of the UE 100 will be described later.

The E-UTRAN 10 corresponds to a radio access network. The E-UTRAN 10 includes a plurality of evolved Node-Bs (eNBs) 200. The eNB 200 corresponds to a base station. The eNBs 200 are connected to each other via an X2 interface. A configuration of the eNB 200 will be described later.

The eNB 200 manages one or more cells and performs radio communication with the UE 100 that has established a connection with a cell thereof. The eNB 200 has a radio resource management (RRM) function, a user data routing function (hereinafter referred to simply as "data"), a measurement control function for mobility control/scheduling, and the like. In addition to a term indicating a minimum unit of a radio communication area, "cell" is also used as a term indicating a function performing radio communication with the UE 100.

The EPC 20 corresponds to a core network. The EPC 20 includes a plurality of mobility management entities (MME)/serving-gateways (S-GW) 300. The MME performs various kinds of mobility control or the like on the UE 100. The S-GW performs data transfer control. The MME/S-GW 300 is connected to the eNB 200 via an S1 interface. The E-UTRAN 10 and the EPC 20 constitute a network.

Figure 2:
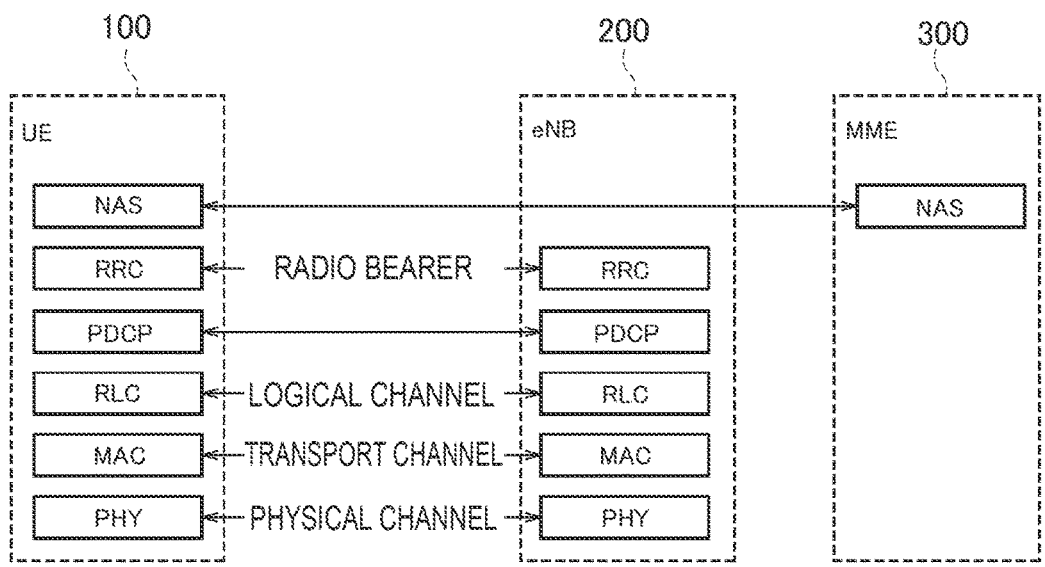
FIG. 2 is a protocol stack diagram of a radio interface in an LTE system.

FIG. 2 is a protocol stack diagram of a radio interface in the LTE system. As illustrated in FIG. 2, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding and decoding, modulation and demodulation, antenna mapping and demapping, and resource mapping and demapping. Data and a control signal are transmitted between the physical layer of the UE 100 and the physical layer of the eNB 200 via the physical channel.

The MAC layer performs priority control of data, a retransmission process by hybrid ARQ (HARQ), a random access procedure, and the like. Data and a control signal are transmitted between the MAC layer of the UE 100 and the MAC layer of the eNB 200 via the transport channel. The MAC layer of the eNB 200 includes a scheduler that determines uplink and downlink transport formats (a transport block size and a modulation and coding scheme (MCS)) and an allocated resource block for the UE 100.

The RLC layer transmits data to the RLC layer on a reception side using the functions of the MAC layer and the physical layer. Data and a control signal are transmitted between the RLC layer of the UE 100 and the RLC layer of the eNB 200 via a logical channel.

The PDCP layer performs header compression/decompression and encryption/decryption.

The RRC layer is defined only on a control plane for dealing with a control signal. A message (RRC message) for various kinds of settings is transmitted between the RRC layer of the UE 100 and the RRC layer of the eNB 200. The RRC layer controls logical channels, transport channels, and physical channels in accordance with establishment, re-establishment, and release of a radio bearer. When there is a connection (RRC connection) between the RRC of the UE 100 and the RRC of the eNB 200, then the UE 100 is in an RRC connected mode (connected mode), and otherwise, the UE 100 is in an RRC idle mode (idle mode).

A non-access stratum (NAS) layer located above the RRC layer performs session management, mobility management, and the like.

Figure 3:
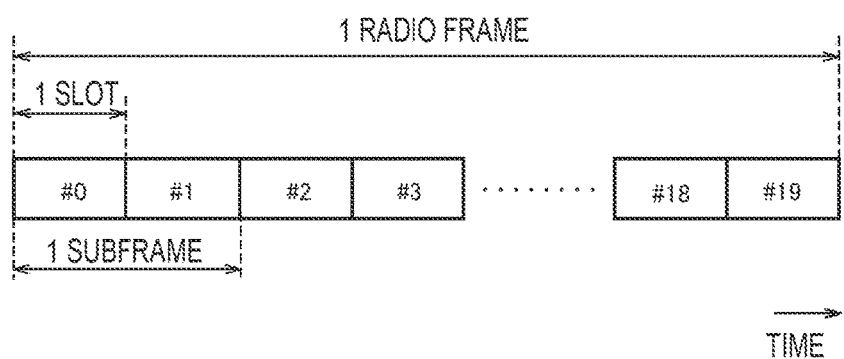
FIG. 3 is a configuration diagram of a radio frame used in an LTE system.

FIG. 3 is a configuration diagram of a radio frame used in the LTE system. In the LTE system, orthogonal frequency division multiplexing access (OFDMA) is applied to downlink, and Single Carrier Frequency Division Multiple Access (SC-FDMA) is applied to uplink.

As illustrated in FIG. 3, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in a time direction. Each resource block includes a plurality of subcarriers in the frequency direction. One symbol and one subcarrier constitute one resource element (RE). Among the radio resources (time/frequency resources) allocated to the UE 100, frequency resources can be specified by resource blocks, and time resources can be specified by subframes (or slots).

In the downlink, an interval of the first few symbols of each subframe is a region used mainly as a physical downlink control channel (PDCCH) for transmitting a downlink control signal. The PDCCH will be described later in detail. The remaining parts of each subframe are a region that can be mainly used as a physical downlink shared channel (PDSCH) for transmitting downlink data.

In the uplink, both end portions of each subframe in the frequency direction are regions used mainly as a physical uplink control channel (PUCCH) for transmitting an uplink control signal. The remaining parts of each subframe are a region that can be used mainly as a physical uplink shared channel (PUSCH) for transmitting uplink data.

(Dual Connectivity)

The LTE system according to the first to eighth embodiments supports "dual connectivity." An overview of the "dual connectivity" will be described.

In the "dual connectivity," only a master eNB (MeNB) among a plurality of eNBs 200 establishing a connection with the UE 100 establishes the RRC connection with the UE 100. On the other hand, a secondary eNB (SeNB) among a plurality of eNBs 200 does not establish the RRC connection with the UE 100 but provides additional radio resources to the UE 100. In other words, the MeNB establishes a control plane connection with the UE 100 in addition to a user plane connection. On the other hand, the SeNB establishes the user plane connection with the UE 100 without establishing the control plane connection with the UE 100. The X2 interface is used for communication between the MeNB and the SeNB.

The UE 100 is able to perform carrier aggregation in which N cells which are managed by the MeNB and M cells which are managed by the SeNB are used at the same time. A maximum of the number of serving cells of the UE 100, that is, a maximum number of (N+M) is, for example, 5. A group composed of N cells which are managed by the MeNB is referred to as a master cell group (MCG). Further, a group composed of M cells which are managed by the SeNB is referred to as a secondary cell group (SCG).

(Installation Scenarios)

The LTE system according to the first to tenth embodiments supports the LTE-WLAN aggregation (WWAN-WLAN aggregation). The UE 100 performs transmission and reception of data with a network using the LTE communication and the WLAN communication simultaneously. The WLAN communication may be a communication scheme based on the IEEE 802.11 standard. The following description will proceed mainly with the downlink, but the present disclosure is not limited to the downlink.

In the LTE system according to the first to tenth embodiments, the WLAN node is collocated with the eNB 200. In this case, the eNB 200 has a WLAN function (WLAN communication unit).

Alternatively, the WLAN node is non-collocated with the eNB 200. In this case, the eNB 200 has a direct interface with the WLAN node. Such a direct interface is also referred to as an "XW interface." The WLAN node is a WLAN access point (WLAN AP). The WLAN node may include a WLAN access controller (WLAN AC) which is a control apparatus of the WLAN access point.

Figure 4:
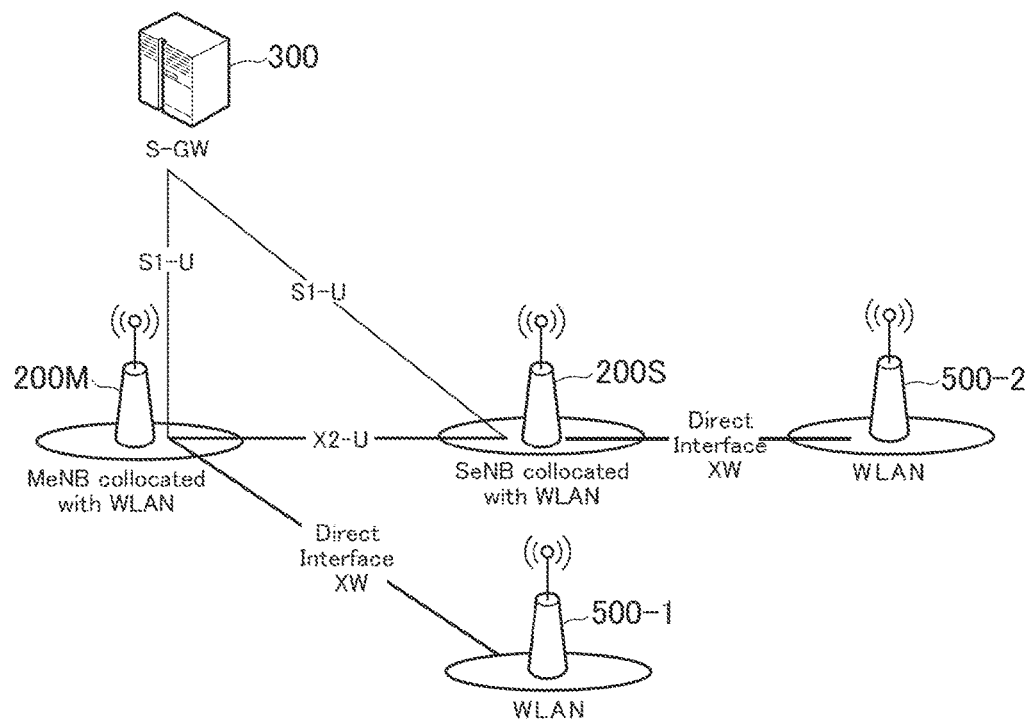
FIG. 4 is a diagram illustrating an overview of an installation scenario of an eNB (base station) and a WLAN node.

FIG. 4 is a diagram illustrating an overview of the installation scenario of the eNB 200 and the WLAN node 500. Here, installation scenarios in which the "dual connectivity" is considered will be described.

A MeNB (master base station) 200M is connected to an S-GW 300 via an S1-U interface as illustrated in FIG. 4. In the case of the non-collocated scenario, a WLAN node 500-1 is connected to MeNB 200M via the XW interface. In the case of the collocated scenario, the MeNB 200M has the WLAN function.

An SeNB (secondary base station) 200S is connected to an S-GW 300 via the S1-U interface and connected to the MeNB 200M via an X2-U interface. In the case of the non-collocated scenario, a WLAN node 500-2 is connected to the SeNB 200S via the XW interface. In the case of the collocated scenario, the SeNB 200S has the WLAN function.

(1) Collocated Scenarios

Specific examples of the collocated scenario will be described below.

(1.1) Collocated Scenario 1

Figure 5A:
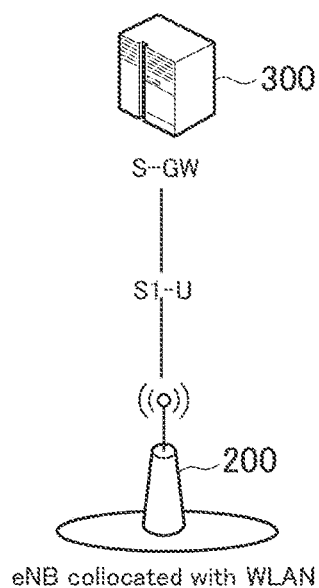
FIGS. 5A and 5B are diagrams illustrating a collocated scenario 1.
Figure 5B:
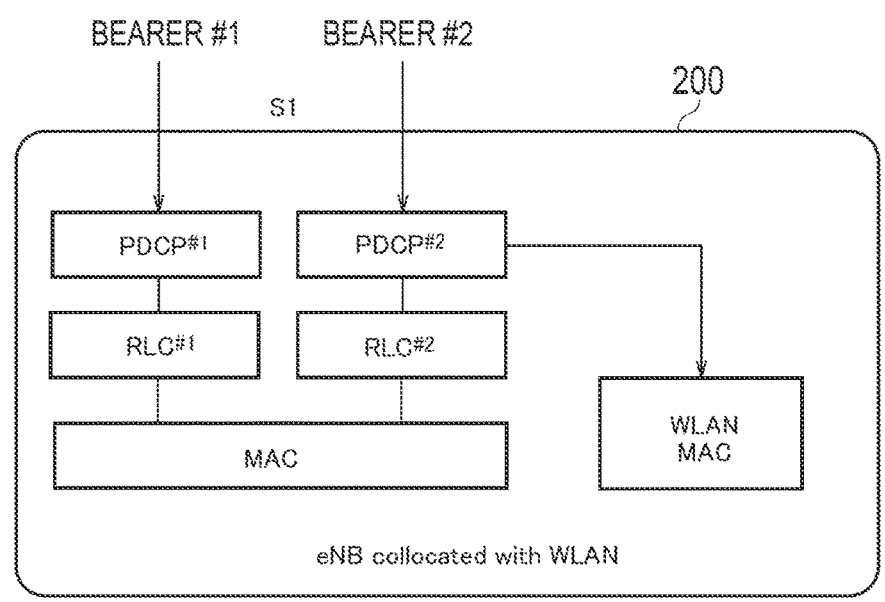

FIGS. 5A and 5B are diagrams illustrating a collocated scenario 1. FIG. 5A illustrates a connection relation of the user plane, and FIG. 5B illustrates a protocol stack of the user plane. In the protocol stack of the following user plane, the RRC layer is not illustrated.

As illustrated in FIG. 5A, in the collocated scenario 1, the eNB 200 has the WLAN function. The eNB 200 is connected to the S-GW 300 via the S1-U interface.

As illustrated in FIG. 5B, the eNB 200 has entities of an LTE protocol and entities of a WLAN protocol. Here, two bearers (E-RAB: E-UTRAN radio access bearers (E-RABs)) are established between the UE 100 and the S-GW 300.

Downlink data of one bearer #1 is processed by entities of a PDCP layer #1, a RLC layer #1, and a MAC layer and transmitted to the UE 100 via an LTE physical layer (not illustrated).

The other bearer #2 is divided (split) into two by a PDCP layer #2. Downlink data of one split bearer of the bearer #2 is processed by entities of an RLC layer #2 and a MAC layer and transmitted to the UE 100 via the LTE physical layer (not illustrated). On the other hand, downlink data of the other split bearer of the bearer #2 is processed by a WLAN MAC layer and transmitted to the UE 100 via a WLAN physical layer (not illustrated).

(1.2) Collocated Scenario 2

Figure 6A:
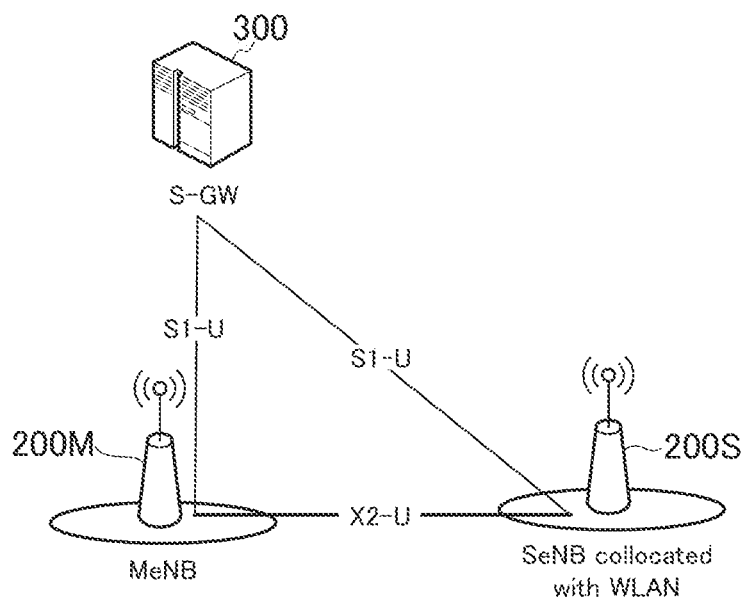
FIGS. 6A and 6B are diagrams illustrating a collocated scenario 2.
Figure 6B:
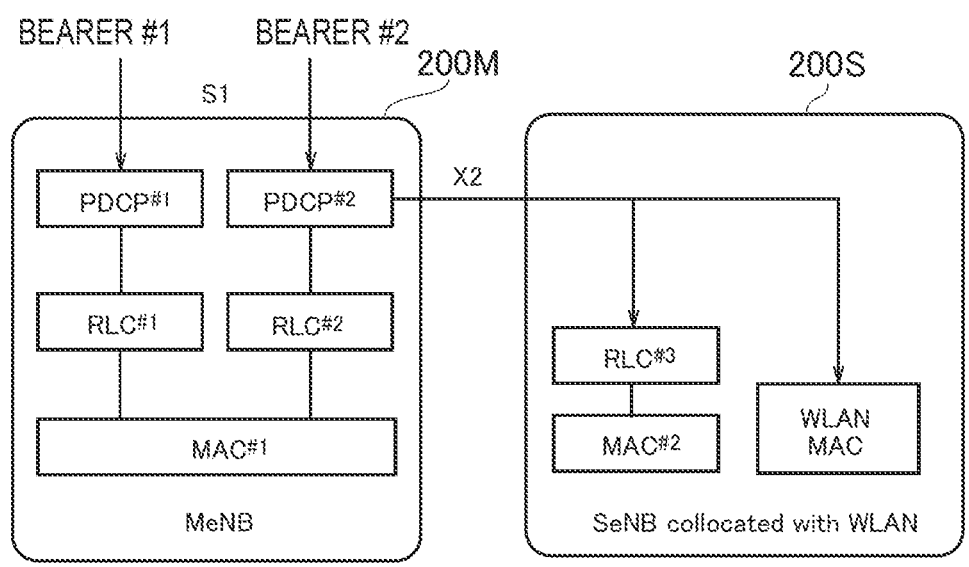

FIGS. 6A and 6B are diagrams illustrating a collocated scenario 2. The collocated scenario 2 is a scenario in which the "dual connectivity" is considered. FIG. 6A illustrates a connection relation of the user plane, and FIG. 6B illustrates a protocol stack of the user plane.

As illustrated in FIG. 6A, in the collocated scenario 2, the SeNB 200S has the WLAN function. Each of the MeNB 200M and the SeNB 200S is connected to the S-GW 300 via the S1-U interface. The MeNB 200M and the SeNB 200S are connected to each other via the X2-U interface.

The MeNB 200M has entities of the LTE protocol as illustrated in FIG. 6B. The SeNB 200S has entities of the LTE protocol and entities of the WLAN protocol. Here, two bearers #1 and #2 are assumed to be established between the UE 100 and the S-GW 300.

In the MeNB 200M, downlink data of one bearer #1 is processed by the entities of the PDCP layer #1, the RLC layer #1, and the MAC layer and transmitted to the UE 100 via the LTE physical layer (not illustrated).

In the MeNB 200M, the other bearer #2 is divided (split) into two by the PDCP layer #2. The downlink data of one split bearer of the bearer #2 is processed by the entities of the RLC layer #2 and the MAC layer and transmitted to the UE 100 via the LTE physical layer (not illustrated).

On the other hand, the other split bearer of the bearer #2 is established via the SeNB 200S. In the SeNB 200S, part of the downlink data of the other split bearer of the bearer #2 is processed by the RLC layer #3 and the MAC layer #2, and the remaining part is processed by the WLAN MAC layer. The downlink data processed by the RLC layer #3 and the MAC layer #2 is transmitted to the UE 100 via the LTE physical layer (not illustrated). The downlink data processed by the WLAN MAC layer is transmitted to the UE 100 via the WLAN physical layer (not illustrated).

In the collocated scenario 2, a method of determining downlink data to be transmitted by the SeNB 200S through the LTE communication and downlink data to be transmitted by the SeNB 200S through the WLAN communication will be described in the sixth embodiment.

(2) Non-Collocated Scenarios

Specific examples of the non-collocated scenario will be described below.

(2.1) Non-Collocated Scenario 1

Figure 7A:
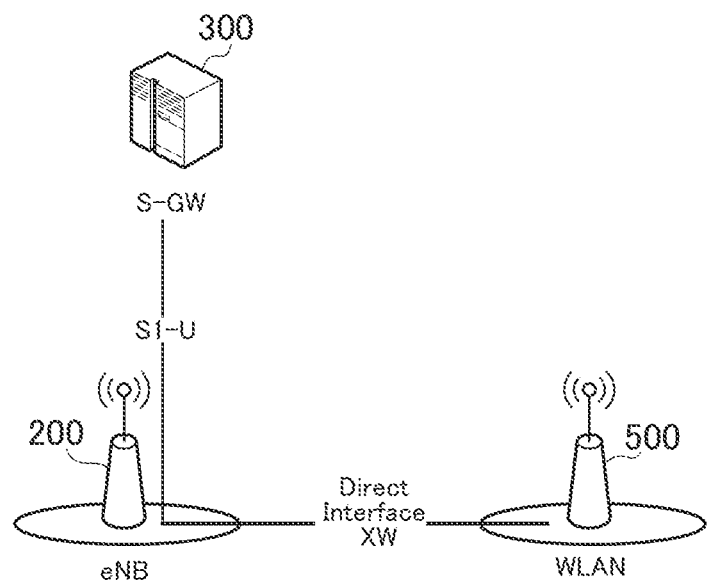
FIGS. 7A and 7B are diagrams illustrating a non-collocated scenario 1.
Figure 7B:
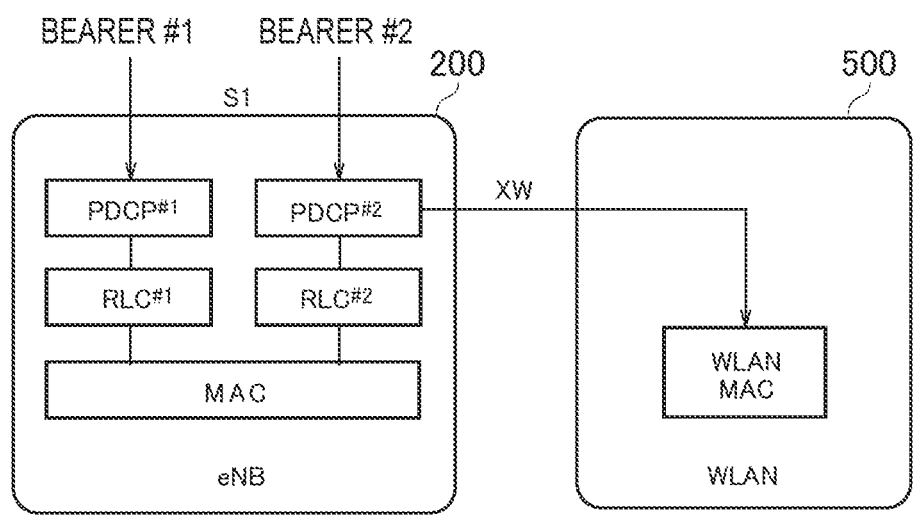

FIGS. 7A and 7B are diagrams illustrating a non-collocated scenario 1. FIG. 7A illustrates a connection relation of the user plane, and FIG. 7B illustrates the protocol stack of the user plane.

As illustrated in FIG. 7A, in the non-collocated scenario 1, the eNB 200 is connected to the S-GW 300 via the S1-U interface. The eNB 200 and the WLAN node 500 are connected to each other via the XW interface.

The eNB 200 has the entities of the LTE protocol as illustrated in FIG. 7B. The WLAN node 500 has the entities of the WLAN protocol. Here, two bearers #1 and #2 are assumed to be established between the UE 100 and the S-GW 300.

In the eNB 200, downlink data of one bearer #1 is processed by the entities of the PDCP layer #1, the RLC layer #1, and the MAC layer and transmitted to the UE 100 via the LTE physical layer (not illustrated).

In the MeNB 200M, the other bearer #2 is divided (split) into two by the PDCP layer #2. Downlink data of one split bearer of the bearer #2 is processed by the entities of the RLC layer #2 and the MAC layer and transmitted to the UE 100 via the LTE physical layer (not illustrated).

On the other hand, the other split bearer of the bearer #2 is established via the WLAN node 500. In the WLAN node 500, downlink data of the other split bearer of the bearer #2 is processed by the WLAN MAC layer and transmitted to the UE 100 via the WLAN physical layer (not illustrated).

(2.2) Non-Collocated Scenario 2

Figure 8A:
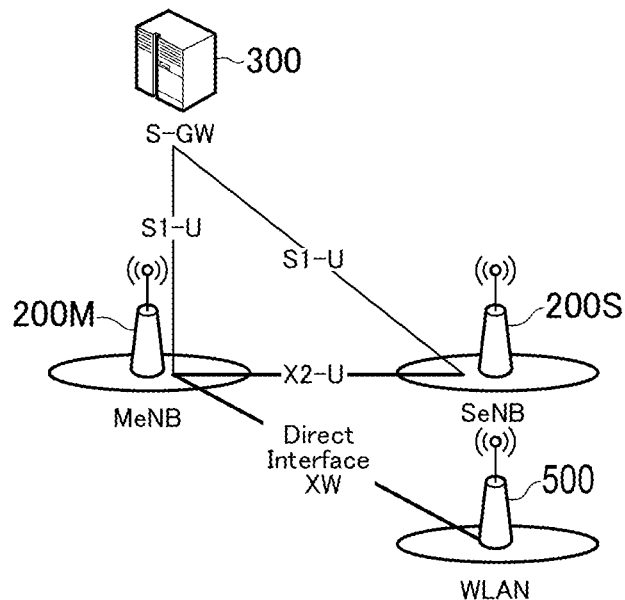
FIGS. 8A and 8B are diagrams illustrating a non-collocated scenario 2.
Figure 8B:
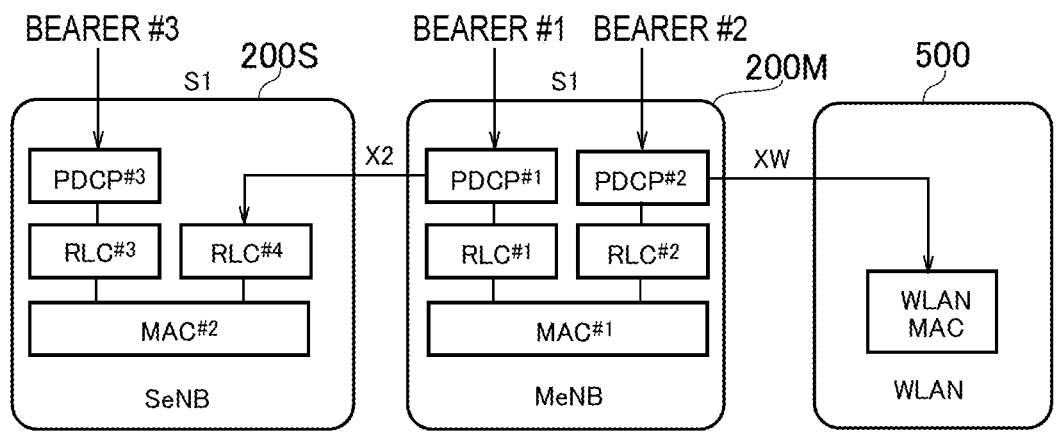

FIGS. 8A and 8B are diagrams illustrating a non-collocated scenario 2. The non-collocated scenario 2 is a scenario in which the "dual connectivity" is considered. FIG. 8A illustrates a connection relation of the user plane, and FIG. 8B illustrates the protocol stack of the user plane.

In the non-collocated scenario 2, each of the MeNB 200M and the SeNB 200S is connected to the S-GW 300 via the S1-U interface as illustrated in FIG. 8A. The MeNB 200M and the SeNB 200S are connected to each other via the X2-U interface. The WLAN node 500 is connected to the MeNB 200M via the XW interface.

Each of the MeNB 200M and the SeNB 200S has the entities of the LTE protocol as illustrated in FIG. 8B. The WLAN node 500 has the entities of the WLAN protocol. Here, three bearers #1 to #3 are assumed to be established between the UE 100 and the S-GW 300.

In the MeNB 200M, the bearer #1 is divided (split) into two by the PDCP layer #1. Downlink data of one split bearer of the bearer #1 is processed by the entities of the RLC layer #1 and the MAC layer #1 and transmitted to the UE 100 via the LTE physical layer (not illustrated). The other split bearer of the bearer #1 is established via the SeNB 200S. In the SeNB 200S, downlink data of the other split bearer of the bearer #1 is processed by the RLC layer #4 and the MAC layer #2 and transmitted to the UE 100 via the LTE physical layer (not illustrated).

In the MeNB 200M, the bearer #2 is divided (split) into two by the PDCP layer #2. Downlink data of one split bearer of the bearer #2 is processed by the entities of the RLC layer #2 and the MAC layer #1 and transmitted to the UE 100 via the LTE physical layer (not illustrated). The other split bearer of the bearer #2 is established via the WLAN node 500. In the WLAN node 500, downlink data of the other split bearer of the bearer #2 is processed by the WLAN MAC layer and transmitted to the UE 100 via the WLAN physical layer (not illustrated).

In the SeNB 200S, downlink data of the bearer #3 is processed by the entities of the PDCP layer #3, the RLC layer #3, and the MAC layer #2 and transmitted to the UE 100 via the LTE physical layer (not illustrated).

(2.3) Non-Collocated Scenario 3

Figure 9A:
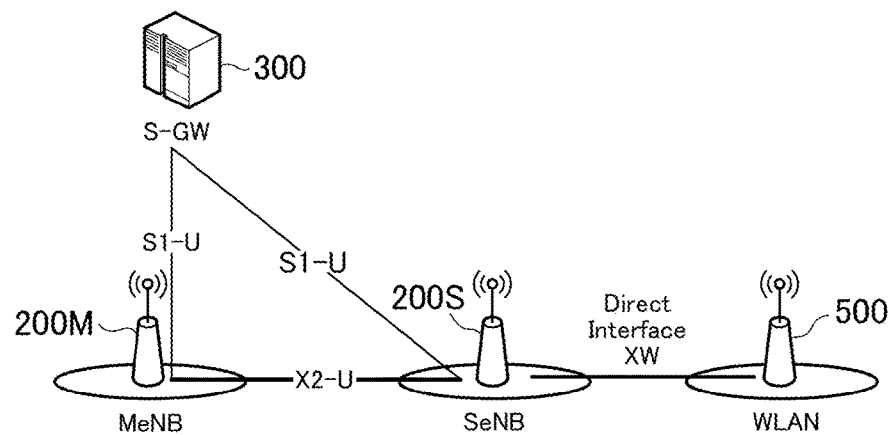
FIGS. 9A and 9B are diagrams illustrating a non-collocated scenario 3.
Figure 9B:
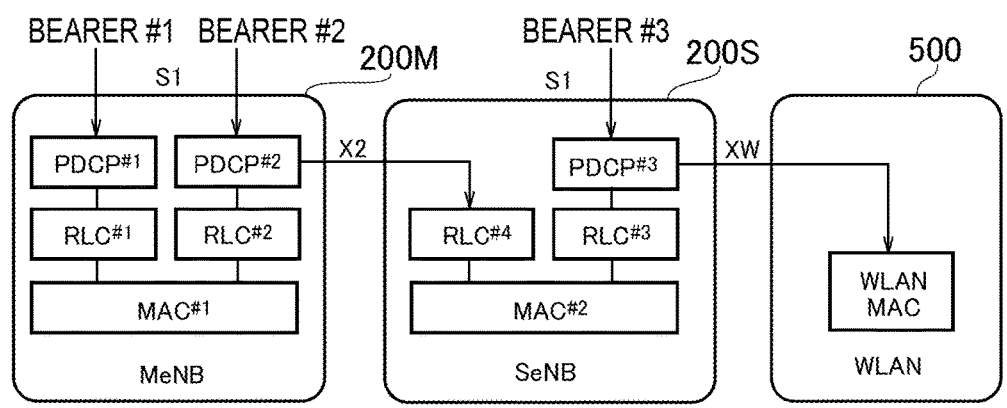

FIGS. 9A and 9B are diagrams illustrating a non-collocated scenario 3. The non-collocated scenario 3 is a scenario in which the "dual connectivity" is considered. FIG. 9A illustrates a connection relation of the user plane, and FIG. 9B illustrates the protocol stack of the user plane.

As illustrated in FIG. 9A, in the non-collocated scenario 3, each of the MeNB 200M and the SeNB 200S is connected to the S-GW 300 via the S1-U interface. The MeNB 200M and the SeNB 200S are connected to each other via the X2-U interface. The WLAN node 500 is connected to the SeNB 200S via the XW interface.

Each of the MeNB 200M and the SeNB 200S has the entities of the LTE protocol as illustrated in FIG. 9B. The WLAN node 500 has the entities of the WLAN protocol. Here, three bearers #1 to #3 are assumed to be established between the UE 100 and the S-GW 300.

In the MeNB 200M, downlink data of the bearer #1 is processed by the entities of the PDCP layer #1, the RLC layer #1, and the MAC layer #1 and transmitted to the UE 100 via the LTE physical layer (not illustrated).

In the MeNB 200M, the bearer #2 is divided (split) into two by the PDCP layer #2. Downlink data of one split bearer of the bearer #2 is processed by the entities of the RLC layer #2 and the MAC layer #1 and transmitted to the UE 100 via the LTE physical layer (not illustrated). The other split bearer of the bearer #2 is established via the SeNB 200S. In the SeNB 200S, downlink data of the other split bearer of the bearer #2 is processed by the RLC layer #4 and the MAC layer #2 and transmitted to UE 100 via the LTE physical layer (not illustrated).

In the SeNB 200S, the bearer #3 is divided (split) into two by the PDCP layer #3. Downlink data of one split bearer of the bearer #3 is processed by the entities of the RLC layer #3 and the MAC layer #2 and transmitted to the UE 100 via the LTE physical layer (not illustrated). The other split bearer of the bearer #3 is established via the WLAN node 500. In the WLAN node 500, downlink data of the other split bearer of the bearer #3 is processed by the WLAN MAC layer and transmitted to the UE 100 via the WLAN physical layer (not illustrated).

First Embodiment

The first embodiment will be described on the premise of the mobile communication system described above.

(Radio Terminal)

Figure 10:
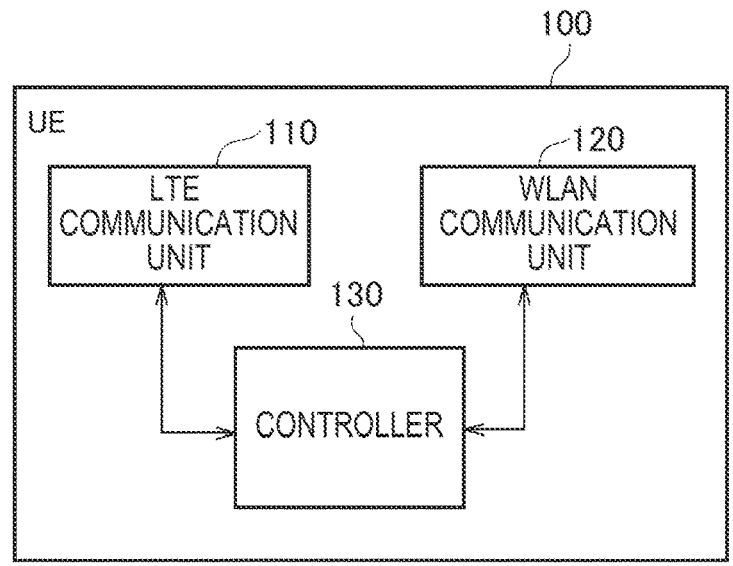
FIG. 10 is a block diagram of a UE (radio terminal).

A UE 100 (radio terminal) according to the first embodiment will be described below. FIG. 10 is a block diagram of the UE 100. The UE 100 includes an LTE communication unit (WWAN communication unit) 110, a WLAN communication unit 120, and a controller 130 as illustrated in FIG. 10.

The LTE communication unit 110 performs LTE communication under the control of the controller 130. The LTE communication unit 110 may execute part of the LTE protocol. The LTE communication unit 110 includes an antenna, a transmitter, and a receiver. The transmitter converts a baseband signal (transmission signal) outputted from the controller 130 into an LTE radio signal and transmits the LTE radio signal from the antenna. The receiver converts an LTE radio signal received by the antenna into a baseband signal (reception signal) and outputs the baseband signal to the controller 130. The LTE communication is generally performed in a licensed band.

The WLAN communication unit 120 performs the WLAN communication under the control of the controller 130. The WLAN communication unit 120 may perform part of the WLAN protocol. The WLAN communication unit 120 includes an antenna, a transmitter, and a receiver. The transmitter converts a baseband signal (transmission signal) outputted by the controller 130 into a WLAN radio signal and transmits the WLAN radio signal from the antenna. The receiver converts a WLAN radio signal received by the antenna into a baseband signal (reception signal) and outputs the baseband signal to the controller 130. The WLAN communication is generally performed in an unlicensed band.

The controller 130 performs various kinds of control in the UE 100. The controller 130 may execute part of the LTE protocol or part of the WLAN protocol. The controller 130 includes a processor and a memory. The memory stores a program executed by a processor and information used for processes performed by the processor. The processor may include a baseband processor that performs modulation and demodulation, encoding and decoding, and the like of the baseband signal and a central processing unit (CPU) that executes a program stored in the memory and performs various kinds of processes. The processor may execute various kinds of processes to be described later and various kinds of communication protocols described above.

The UE 100 having the above configuration is capable of performing the LTE-WLAN aggregation communication using the LTE communication and the WLAN communication simultaneously. For example, the UE 100 performs the LTE-WLAN aggregation communication in each of the installation scenarios (each of the collocated scenarios and each of the non-collocated scenarios).

In the first embodiment, the WLAN communication unit 120 measures a channel state of the WLAN communication while the LTE-WLAN aggregation communication is being performed. The controller 130 generates WLAN measurement information (WLAN channel information) indicating a measured channel state (measurement result). The controller 130 may generate the WLAN measurement information for each of frequency channels included in a WLAN frequency band (unlicensed band). Alternatively, the controller 130 may generate WLAN measurement information indicating overall channel information of the WLAN frequency band (unlicensed band). The WLAN measurement information may be a parameter obtained by converting a parameter specified in the WLAN standard (IEEE 802.11 standard) into a parameter for LTE. The LTE communication unit 110 transmits the WLAN measurement information to a specific eNB 200. In the first embodiment, the controller 130 and the LTE communication unit 110 constitute a transmitter that transmits the WLAN measurement information to the specific eNB 200 while the LTE-WLAN aggregation communication is being performed.

In the first embodiment, the specific eNB 200 is an eNB 200 that controls at least one of releasing, modifying, and deactivating of a configuration of the LTE-WLAN aggregation communication in the UE 100. The configuration of the LTE-WLAN aggregation communication includes a configuration of the WLAN communication. For example, in the "dual connectivity", the specific eNB 200 is an MeNB (master base station) 200M having an RRC connection with the UE 100. It is preferable for the LTE communication unit 110 to transmits the WLAN measurement information to a primary cell (PCell) in the MCG of the MeNB 200M.

The LTE communication unit 110 transmits the WLAN measurement information to the MeNB 200M through physical layer signaling specified in a physical layer specification of the LTE communication. It is possible to give dynamic feedback by transmitting the WLAN measurement information to the MeNB 200M through the physical layer signaling. For example, the WLAN measurement information is included in an uplink control information (UCI) specified in the physical layer specification. The WLAN measurement information may be transmitted together with the channel state information (CSI) of the LTE communication or may be transmitted separately from the CSI of the LTE communication. The CSI of the LTE communication includes at least one of a channel quality indicator (CQI), a precoder matrix indicator (PMI), and a rank indicator (RI). The WLAN measurement information is preferably transmitted on the PUCCH. The WLAN measurement information may be transmitted on the PUSCH. Further, the WLAN measurement information may be transmitted periodically or may be transmitted using the occurrence of a set event as a trigger (event trigger). A feedback setting of the WLAN measurement information may be performed through RRC signaling from the MeNB 200M. The RRC signaling (RRC message) may include "MeasObjectWLAN" or "MeasObjectIeee" indicating a measurement object (MeasObject) for WLAN. MeasObject may include at least one of information designating CarrierFreq (a corresponding frequency band), information designating an IEEE specification (b/a/g/n/ac . . . ), and a WLAN identifier (SSID/BSSID/ . . . ). Further, the RRC signaling (RRC message) may include information designating a trigger. The trigger may be an existing trigger (an event A3 or the like) or "RAN rule" of an existing WLAN interworking (an RSRP/RSRQ threshold value or a WLAN load threshold value).

The WLAN measurement information includes a WLAN channel quality parameter (a WLAN Channel Quality Indicator). For example, the "WLAN Channel Quality Indicator" is a parameter indicating WLAN reception power (RSSI or the like) or a WLAN reception quality (SNR or the like).

The WLAN measurement information may include a WLAN congestion parameter (WLAN Congestion Indicator). The "WLAN Congestion Indicator" may be a parameter indicating interference power detected by a carrier sense (Listen Before Talk (LBT)) in the WLAN communication or may be a parameter indicating a success rate or a failure rate of LBT.

The WLAN measurement information may include an ACK/NACK indicating whether or not the WLAN reception signal has been correctly received. Specifically, in a case in which the WLAN reception signal is successfully decoded, the ACK is transmitted, and in a case in which the WLAN reception signal fails to be decoded, the NACK is transmitted.

The LTE communication unit 110 may transmit a WLAN resource allocation request (a Scheduling Request (SR) to the MeNB 200M through the physical layer signaling specified in the physical layer specification of the LTE communication.

(Base Station)

Figure 11:
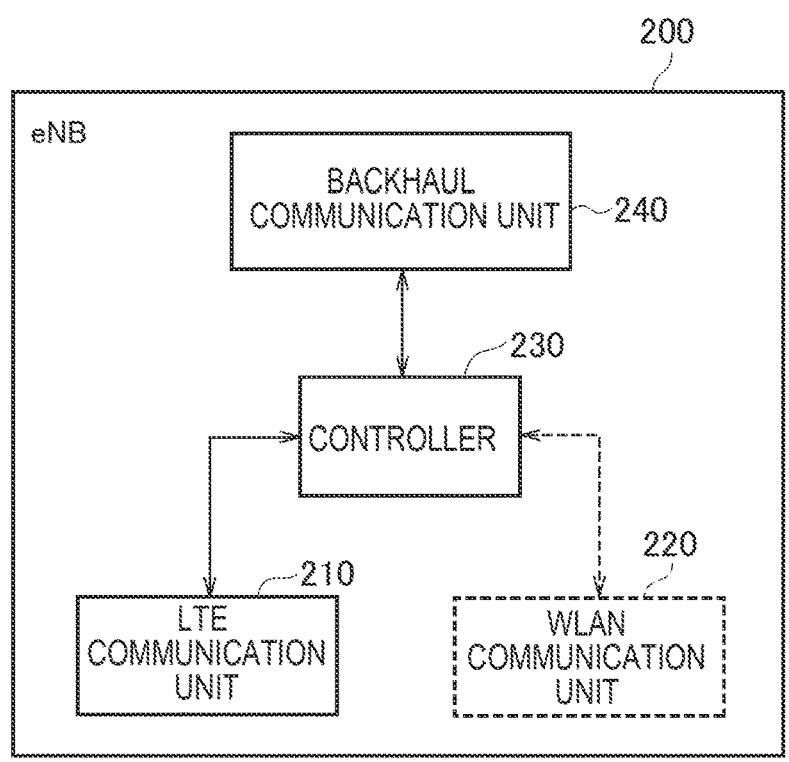
FIG. 11 is a block diagram of an eNB.

An eNB 200 (base station) according to the first embodiment will be described below. FIG. 11 is a block diagram of the eNB 200. The eNB 200 includes an LTE communication unit 210, a WLAN communication unit 220, a controller 230, and a backhaul communication unit 240 as illustrated in FIG. 11. However, in the non-collocated scenario, the eNB 200 may not have the WLAN communication unit 220.

The LTE communication unit 210 performs the LTE communication under the control of the controller 230. The LTE communication unit 210 may execute part of the LTE protocol. The LTE communication unit 210 includes an antenna, a transmitter, and a receiver. The transmitter converts a baseband signal (transmission signal) outputted from the controller 230 into an LTE radio signal and transmits the LTE radio signal from the antenna. The receiver converts an LTE radio signal received by the antenna into a baseband signal (reception signal) and outputs the baseband signal to the controller 230.

The WLAN communication unit 220 performs the WLAN communication under the control of the controller 230. The WLAN communication unit 220 may perform part of the WLAN protocol. The WLAN communication unit 220 includes an antenna, a transmitter, and a receiver. The transmitter converts a baseband signal (transmission signal) outputted by the controller 230 into a WLAN radio signal and transmits the WLAN radio signal from the antenna. The receiver converts a WLAN radio signal received by the antenna into a baseband signal (reception signal) and outputs the baseband signal to the controller 230.

The controller 230 performs various kinds of control in the eNB 200. The controller 230 may execute part of the LTE protocol or part of the WLAN protocol. The controller 230 includes a processor and a memory. The memory stores a program executed by a processor and information used for processes performed by the processor. The processor may include a baseband processor that performs modulation/demodulation, encoding/decoding, and the like of the baseband signal and a central processing unit (CPU) that executes a program stored in the memory and performs various kinds of processes. The processor executes various kinds of processes to be described later and various kinds of communication protocols as described above.

The backhaul communication unit 240 is connected to a neighbor eNB 200 via the X2 interface and connected to the MME/S-GW 300 via the S1 interface. The backhaul communication unit 240 is used for communication to be performed on the X2 interface, communication to be performed on the S1 interface, and the like. In the non-collocated scenario, the backhaul communication unit 240 is connected to the WLAN node 500 via the XW interface.

The eNB 200 having the above configuration is capable of performing the LTE-WLAN aggregation communication using the LTE communication and the WLAN communication simultaneously. For example, the eNB 200 performs the LTE-WLAN aggregation communication in each of the installation scenarios (each of the collocated scenarios and each of the non-collocated scenarios). In the first embodiment, the eNB 200 is assumed to be the MeNB 200M in the "dual connectivity."

In the eNB 200 (the MeNB 200M), the LTE communication unit 210 receives the WLAN measurement information indicating the channel state of the WLAN communication from the UE 100 while the LTE-WLAN aggregation communication with the UE 100 is being performed. In the first embodiment, the LTE communication unit 210 corresponds to a receiver that receives the WLAN measurement information while LTE-WLAN aggregation communication is being performed.

In the first embodiment, the controller 230 controls at least one of releasing, modifying, and deactivating of the configuration of the LTE-WLAN aggregation communication in the UE 100 on the basis of the WLAN measurement information.

For example, the controller 230 may perform control such that the configuration of the WLAN communication is released or deactivated in a case in which the state of the WLAN communication is determined to deteriorate. Alternatively, the controller 230 may perform control such that the bearer to which the WLAN communication is applied is changed to the LTE communication. Further, the controller 230 may perform control to stop the splitting of the split bearer so that the WLAN node 500 is not passed through.

The controller 230 transmits a control signal (for example, an "RRC Connection Reconfiguration" message) for giving an instruction to release, modify, or deactivate the configuration of the WLAN communication to the UE 100 via the LTE communication unit 210.

(Example of Operation Sequence)

Figure 12:
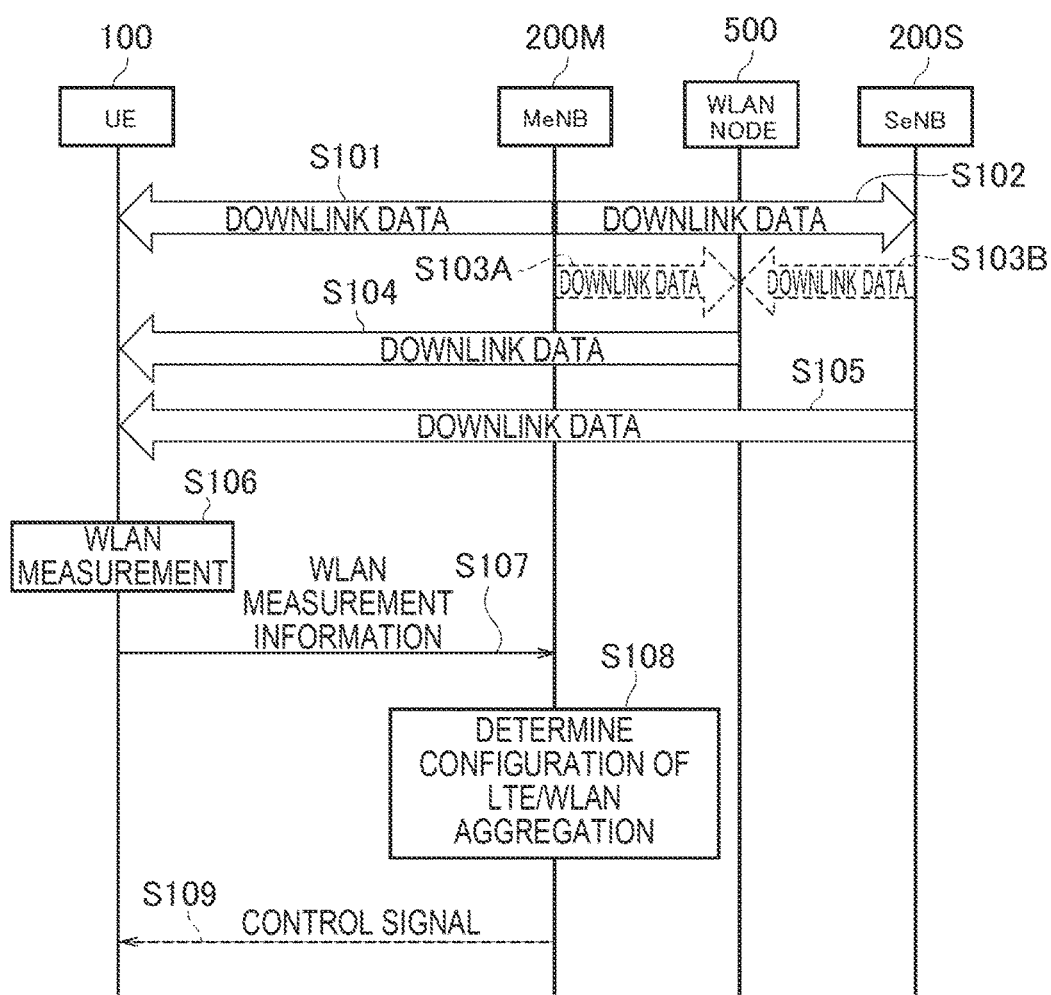
FIG. 12 is a sequence diagram illustrating an example of an operation sequence according to the first embodiment.

Next, an example of an operation sequence according to the first embodiment will be described. FIG. 12 is a sequence diagram illustrating an example of an operation sequence according to the first embodiment. Here, the non-collocated scenario 2 or 3 is assumed.

As illustrated in FIG. 12, in step S101, the MeNB 200M transmits downlink data to the UE 100 through the LTE communication. In step S102, the MeNB 200M transfers downlink data destined for the UE 100 to the SeNB 200S through backhaul communication.

In step S103A or S103B, the MeNB 200M or the SeNB 200S transfers the downlink data destined for the UE 100 to the WLAN node 500 through the backhaul communication. In step S104, the WLAN node 500 transmits the downlink data to the UE 100 through the WLAN communication.

In step S105, the SeNB 200S transmits the downlink data to the UE 100 through the LTE communication.

As described above, through the LTE-WLAN aggregation communication with "dual connectivity", downlink radio resources are allocated from the MeNB 200M, the SeNB 200S, and the WLAN node 500 to the UE 100, and data is received. Accordingly, high-speed large-capacity communication can be implemented.

In step S106, the UE 100 performs the WLAN measurement. Then, in step S107, the UE 100 transmits the WLAN measurement information to the MeNB 200M.

In step S108, the MeNB 200M determines whether or not at least one of releasing, modifying, and deactivating of the configuration of the LTE-WLAN aggregation communication in the UE 100 is performed on the basis of the WLAN measurement information. If at least one of releasing, modifying, and deactivating of the configuration of the LTE-WLAN aggregation communication in the UE 100 is determined to be performed, in step S109, the MeNB 200M transmits a control signal to the UE 100.

As described above, according to the first embodiment, it is possible to properly control the configuration of the LTE-WLAN aggregation in accordance with the state of the WLAN communication of the UE 100 during the LTE-WLAN aggregation communication.

Modified Example of First Embodiment

In the first embodiment, the example in which the WLAN measurement information is transmitted through the physical layer signaling has been described. However, the WLAN measurement information may be transmitted through the RRC signaling. For example, the UE 100 includes the WLAN measurement information in a "Measurement Report" and transmits the resulting message to the MeNB 200M.

Second Embodiment

The second embodiment will be described focusing on a difference with the first embodiment.
(Radio Terminal)
A UE 100 according to the second embodiment transmits the WLAN measurement information to the eNB 200 that performs the bearer splitting without fixing the transmission destination (the specific eNB 200) of the WLAN measurement information to the MeNB 200M.

The eNB 200 that performs the bearer splitting is an eNB 200 that splits one bearer of the UE 100 into a first bearer (first split bearer) for the LTE communication and a second bearer (second split bearer) for the WLAN communication and performs data allocation between the first split bearer and the second split bearer.

For example, in the non-collocated scenario 3 (see FIG. 9B), the PDCP layer #3 of the SeNB 200S performs the data allocation between the first split bearer (for the LTE communication) and the second split bearer (for the WLAN communication) of the bearer #3. The UE 100 transmits the WLAN measurement information to the SeNB 200S rather than the MeNB 200M. Preferably, the UE 100 transmits the WLAN measurement information to the primary/secondary cell (PSCell) in the SCG of the SeNB 200S.

However, in a case in which the data allocation between the LTE and the WLAN is performed through the PDCP layer of the MeNB 200M, the UE 100 transmits the WLAN measurement information to the MeNB 200M as in the first embodiment.

Information indicating whether it is the bearer of the SCG or the bearer of the MCG is configured in the UE 100 through the RRC signaling from the MeNB 200M. Therefore, in a case in which a "PDCP PDU" configured as the bearer of the SCG is received via the WLAN, the UE 100 is able to determine that it has been split through the PDCP layer of the SeNB 200S. Alternatively, an eNB or a cell of the transmission destination (feedback destination) of the WLAN measurement information may be configured in the UE 100 through the RRC signaling from the MeNB 200M.
(Base Station)
An eNB 200 according to the second embodiment splits one bearer of the UE 100 into the first bearer (first split bearer) for the LTE communication and the second bearer (second split bearer) for the WLAN communication, and performs the data allocation between the first split bearer and the second split bearer. The eNB 200 receives the WLAN measurement information from the UE 100.

In the second embodiment, the eNB 200 performs the data allocation between the first split bearer and the second split bearer on the basis of the WLAN measurement information. In other words, the eNB 200 changes a data transmission ratio between the LTE and the WLAN on the basis of the WLAN measurement information. Alternatively, in a case in which a buffer for the LTE communication and a buffer for the WLAN communication are separately disposed, the eNB 200 may change the data transmission ratio between the LTE and the WLAN in accordance with a size of each buffer or a state of each buffer.

Figure 13:
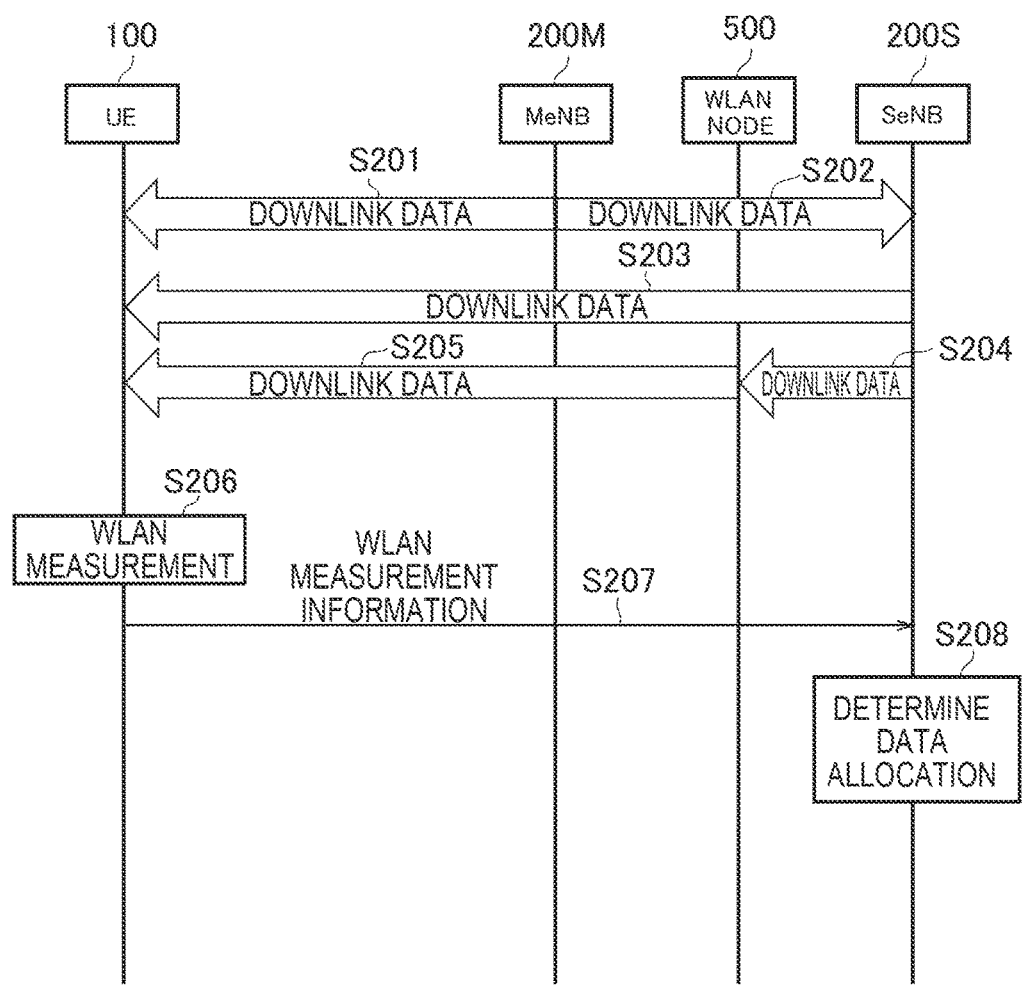
FIG. 13 is a sequence diagram illustrating an example of an operation sequence according to the second embodiment.

For example, the eNB 200 changes the data transmission ratio so that as the state of the WLAN communication in the UE 100 gets worse, a WLAN transmission ratio is decreased, and an LTE transmission ratio is increased. On the other hand, the eNB 200 changes the data transmission ratio so that as the state of the WLAN communication in the UE 100 gets better, the WLAN transmission ratio is increased, and the LTE transmission ratio is decreased.
(Example of Operation Sequence)
An example of an operation sequence according to the second embodiment will be described below. FIG. 13 is a sequence diagram illustrating an example of an operation sequence according to the second embodiment. Here, the non-collocated scenario 3 is assumed.

As illustrated in FIG. 13, in step S201, the MeNB 200M transmits the downlink data to the UE 100 through the LTE communication. In step S202, the MeNB 200M transfers the downlink data destined for the UE 100 to the SeNB 200S through the backhaul communication.

In step S203, the SeNB 200S transmits the downlink data allocated for LTE transmission in its own PDCP layer to the UE 100 through the LTE communication. In step S204, the SeNB 200S transfers the downlink data allocated for the WLAN transmission in its own PDCP layer to the WLAN node 500 through the backhaul communication. In step S205, the WLAN node 500 transmits the downlink data transferred from the SeNB 200S to the UE 100 through the WLAN communication.

In step S206, the UE 100 performs the WLAN measurement. Then, in step S207, the UE 100 transmits the WLAN measurement information to the SeNB 200S.

In step S208, the SeNB 200S performs the data allocation between the split bearers so that the data transmission ratio between the LTE and the WLAN is changed on the basis of the WLAN measurement information.

As described above, according to the second embodiment, it is possible to appropriately control the data transmission ratio between the LTE and the WLAN in accordance with the state of the WLAN communication of UE 100 during the LTE-WLAN aggregation communication.

Third Embodiment

The third embodiment will be described focusing on a difference with the first and second embodiments. The third embodiment is an embodiment in which the collocated scenario is considered.

In the first and second embodiments described above, the UE 100 transmits the WLAN measurement information to the eNB 200 through the LTE communication. However, the eNB 200 having the WLAN function (the WLAN communication unit 220) is able to acquire the WLAN measurement information using its own WLAN function.
(Base Station)
In an eNB 200 according to the third embodiment, the WLAN communication unit 220 acquires the WLAN measurement information indicating the channel state of the WLAN communication while the LTE-WLAN aggregation communication is being performed.

A TDD scheme is generally applied to the WLAN communication, and it has uplink/downlink channel reversibility. In other words, it is possible to estimate a downlink channel state from an uplink channel state. Thus, the WLAN communication unit 220 obtains the WLAN measurement information by measuring the WLAN reception power or reception quality.

Alternatively, in a case in which a CSI feedback mechanism is introduced into the WLAN communication, the UE 100 may feed back the WLAN measurement information specified in the LTE standard instead of the CSI value specified in the WLAN standard or in addition to the CSI value specified in the WLAN standard. The WLAN communication unit 220 receives the WLAN measurement information from the UE 100. Alternatively, the controller 230 may convert the CSI value specified in the WLAN standard into the WLAN measurement information specified in the LTE standard.

The controller 230 controls the LTE-WLAN aggregation communication on the basis of the WLAN measurement information acquired through the WLAN communication unit 220. For example, similarly to the first embodiment, the controller 230 controls at least one of releasing, modifying, and deactivating of the configuration of the LTE-WLAN aggregation communication in the UE 100 on the basis of the WLAN measurement information. Alternatively, similarly to the second embodiment, the controller 230 performs the data allocation between the first split bearer and the second split bearer on the basis of the WLAN measurement information.

(Example of Operation Flow)

Figure 14:
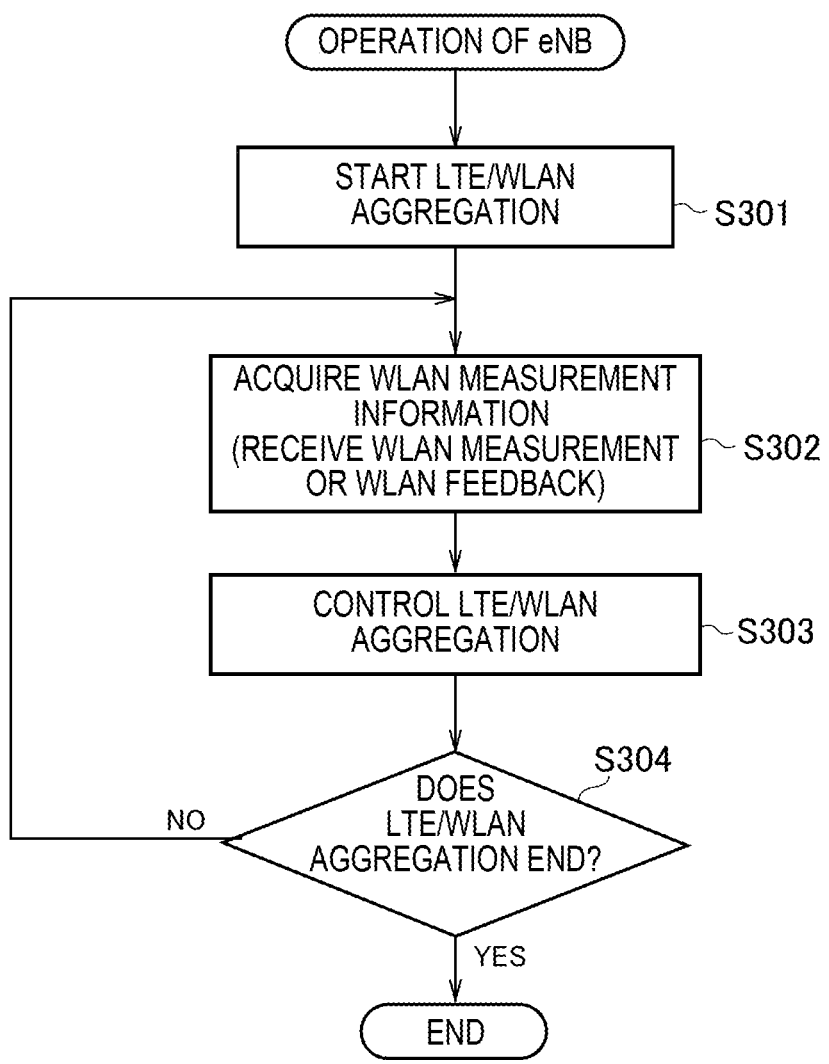
FIG. 14 is a flowchart illustrating an example of an operation flow of an eNB according to the third embodiment.

FIG. 14 is a flowchart illustrating an example of an operation flow of the eNB 200 according to the third embodiment.

As illustrated in FIG. 14, in step S301, the eNB 200 starts the LTE-WLAN aggregation with the UE 100. For example, "start LTE-WLAN aggregation with UE 100" indicates that a setting to add the WLAN as a serving cell is performed in the UE 100 through the RRC. It may be a WLAN deactivated state at the stage at which the setting is performed.

In step S302, the eNB 200 acquires the WLAN measurement information indicating the channel state of the WLAN communication through the WLAN communication unit 220.

In step S303, the eNB 200 controls the LTE-WLAN aggregation communication on the basis of the WLAN measurement information acquired through the WLAN communication unit 220.

In step S304, the eNB 200 determines whether or not the LTE-WLAN aggregation communication ends. In a case in which the LTE-WLAN aggregation communication is continued (No in step S304), the process returns to step S302. In a case in which the LTE-WLAN aggregation communication ends (Yes in step S304), the present flow ends.

Fourth Embodiment

The fourth embodiment will be described focusing with a difference with the first to third embodiments. A basic concept of the fourth embodiment is similar to the third embodiment. However, the fourth embodiment is an embodiment in which the non-collocated scenario is considered.

(Base Station)

The controller 230 of the eNB 200 according to the fourth embodiment acquires the WLAN measurement information indicating the channel state of the WLAN communication from the WLAN node 500 while the LTE-WLAN aggregation communication is being performed. A method of acquiring the WLAN measurement information in the WLAN node 500 is similar to that of the third embodiment.

The controller 230 acquires the WLAN measurement information from the WLAN node 500 via the XW interface. The controller 230 may transmit a WLAN measurement information transmission request to the WLAN node 500 via the XW interface.

For example, the XW interface is terminated at a wireless LAN Termination (WT). The WT is an end point on the WLAN side of the XW interface. The WT acquires the WLAN measurement information and transmits the WLAN measurement information to the eNB 200. The XW interface may be set for communication with the WLAN node 500 in the non-collocated scenario or may use an existing inter-eNB communication interface (the X2 interface).

Further, the controller 230 controls the LTE-WLAN aggregation communication on the basis of the WLAN measurement information.

In the fourth embodiment, the controller controls at least one of releasing, modifying, and deactivating of the configuration of the LTE-WLAN aggregation communication in the UE 100 on the basis of the WLAN measurement information. For example, similarly to the first embodiment, the controller 230 controls at least one of releasing, modifying, and deactivating of the configuration of the LTE-WLAN aggregation communication in the UE 100 on the basis of the WLAN measurement information. Alternatively, similarly to the second embodiment, the controller 230 performs the data allocation between the first split bearer and the second split bearer on the basis of the WLAN measurement information.

(Example of Operation Flow)

Figure 15:
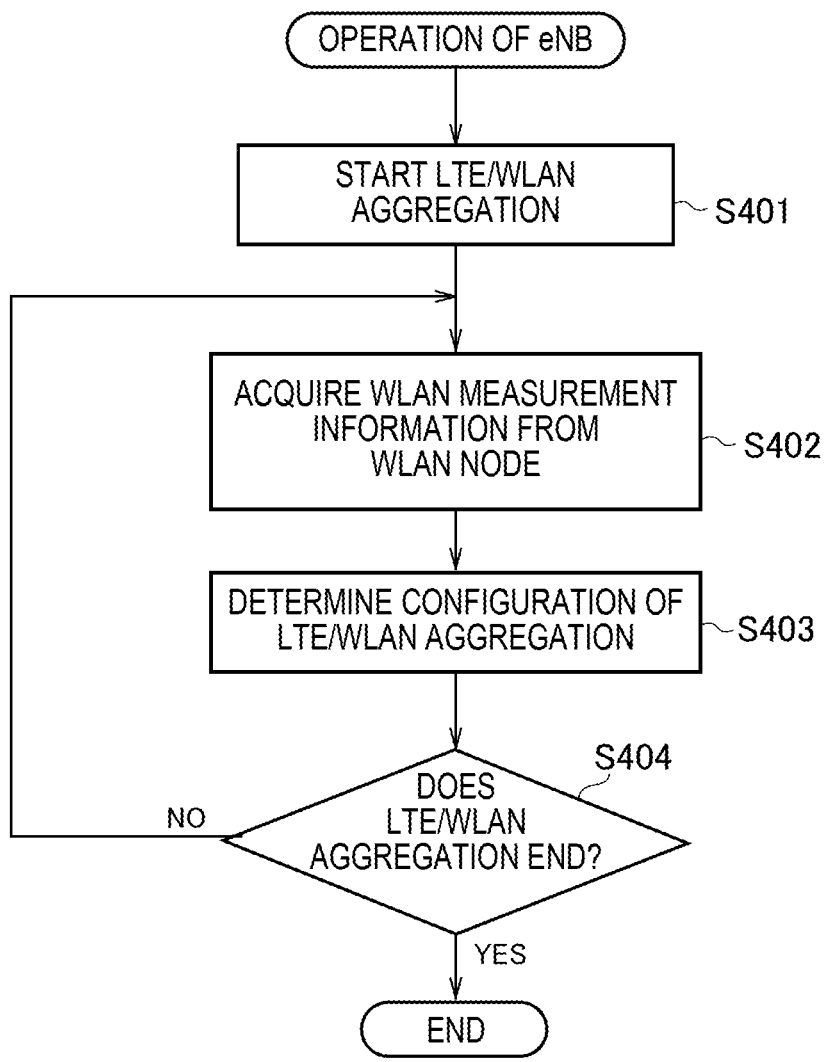
FIG. 15 is a flowchart illustrating an example of an operation flow of an eNB according to the fourth embodiment.

FIG. 15 is a flowchart illustrating an example of an operation flow of the eNB 200 according to the fourth embodiment.

As illustrated in FIG. 15, in step S401, the eNB 200 starts the LTE-WLAN aggregation with the UE 100. For example, "start LTE-WLAN aggregation with UE 100" indicates that a setting to add the WLAN as a serving cell is performed in the UE 100 through the RRC. It may be a WLAN deactivated state at the stage at which the setting is performed.

In step S402, the eNB 200 acquires the WLAN measurement information indicating the channel state of the WLAN communication from the WLAN node 500.

In step S403, the eNB 200 controls the LTE-WLAN aggregation communication on the basis of the WLAN measurement information acquired from the WLAN node 500.

In step S404, the eNB 200 determines whether or not the LTE-WLAN aggregation communication ends. In a case in which the LTE-WLAN aggregation communication is continued (No in step S404), the process returns to step S402. In a case in which the LTE-WLAN aggregation communication ends (Yes in step S404), the present flow ends.

Fifth Embodiment

The fifth embodiment will be described focusing on a difference with the first to fourth embodiments. The first to fourth embodiments have been described in connection with the downlink. On the other hand, the fifth embodiment will be described in connection with the uplink.

In the fifth embodiment, uplink data is assumed to be transmitted from the UE 100 to the PDCP layer of the SeNB 200S via two paths of the SeNB 200S including the SCG (the LTE communication) and the WLAN communication. Since the SeNB 200S does not have the RRC, it is difficult to set the uplink data path (data path) through the RRC signaling.

(Radio Terminal)

The UE 100 according to the fifth embodiment is a UE 100 which is capable of performing the LTE-WLAN aggregation communication using the LTE communication and the WLAN communication simultaneously. In the UE 100, the controller 130 selects the first bearer to which the LTE communication is applied for the uplink data transmission and the second bearer to which the WLAN communication is applied to the uplink data transmission. The LTE communication unit 110 transmits the uplink data of the first bearer through the LTE communication, and the WLAN communication unit 120 transmits the uplink data of the second bearer through the WLAN communication. In the fifth embodiment, the LTE communication unit 110 and the WLAN communication unit 120 constitute a transmitter.

In the fifth embodiment, the LTE communication unit 110 receives control information indicating whether the LTE communication or the WLAN communication is applied to the bearer of the UE 100 from a specific eNB 200. In the fifth embodiment, the LTE communication unit 110 corresponds to a receiver that receives the control information. The controller 130 selects the first bearer and the second bearer in accordance with the received control information.

In the fifth embodiment, the specific eNB 200 that transmits the control information is the SeNB 200S. Specifically, the specific eNB 200 that transmits the control information is an SeNB 200S that performs the bearer splitting (bearer coupling in the case of the uplink) in the PDCP layer. The SeNB 200S may have a WLAN function (collocated) or may be connected to the WLAN node 500 (non-collocated). In the bearer splitting/coupling in the PDCP layer, the method of deciding the data ratio between the LTE and the WLAN according to the above-described embodiment is used. However, the specific eNB 200 that transmits the control information may be the MeNB 200M. The MeNB 200M may perform the bearer splitting/coupling in the PDCP layer.

Figures 16A, 16B:
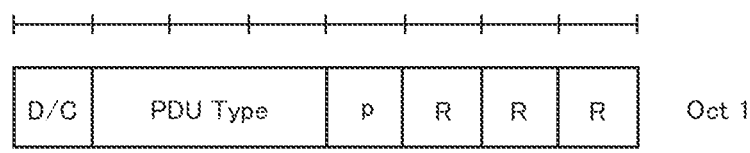
FIGS. 16A and 16B are diagrams illustrating an example of control information according to the fifth embodiment.

The LTE communication unit 110 of the UE 100 receives the control information from the specific eNB 200 through the PDCP layer signaling. FIGS. 16A and 16B are diagrams illustrating an example of the control information according to the fifth embodiment. The control information is transmitted and received for each bearer of the UE 100.

The PDCP packet (PDCP PDU) includes a 1-bit "D/C" field indicating whether the PDU is a data PDC or a control PDU, a 3-bit "PDU Type" field indicating a type of PDU, and a "p" field indicating an uplink data path as illustrated in FIG. 16A. The "PDU Type" field indicates the type of PDU using 3-bit information as illustrated in FIG. 16B.

In the PDCP PDU related to the fifth embodiment, a value indicating that the PDU is a control PDU is set in the "D/C" field. Further, "010" indicating "UL data path" is configured in the "PDU Type" field. Either "0" indicating LTE (MCG/SCG) or "1" indicating WLAN is configured in "p" field.

By using the PDCP PDU, control can be performed such that the uplink data is transmitted to the bearer #1 of the UE 100 through the SCG (LTE communication) of the SeNB 200S, and the uplink data is transmitted to the bearer #2 of the UE 100 through the WLAN communication.

(Example of Operation Flow)

FIG. 17 is a flowchart illustrating an example of an operation flow of the UE 100 according to the fifth embodiment.

As illustrated in FIG. 17, in step S501, the UE 100 starts the LTE-WLAN aggregation. For example, "start LTE-WLAN aggregation with UE 100" indicates that a setting to add the WLAN as a serving cell is performed in the UE 100 through the RRC. It may be a WLAN deactivated state at the stage at which the setting is performed.

In a case in which the UE 100 receives the control PDU (PDCP control information) indicating "UL data path" from the SeNB 200S (Yes in step S502), then in step S503, the UE 100 selects the LTE communication or the WLAN communication for a corresponding bearer in accordance with the "p" field included in the control PDU.

In step S504, the UE 100 transmits the uplink data of the bearer (the first bearer), which was selected for LTE communication, through the LTE communication and transmits the uplink data of the bearer (the second bearer), which was selected for WLAN communication, through the WLAN communication.

In step S505, the UE 100 determines whether or not the LTE-WLAN aggregation communication ends. In a case in which the LTE-WLAN aggregation communication is continued (step S505: No), the process returns to step S502. In a case in which the LTE-WLAN aggregation communication ends (Yes in step S505), the present flow ends.

Modified Example of Fifth Embodiment

In the fifth embodiment, the UE 100 selects the LTE communication or the WLAN communication for each bearer in accordance with the control PDU (the PDCP control information) transmitted from the eNB 200 (the SeNB 200S). However, the UE 100 may autonomously select the LTE communication or the WLAN communication for each bearer regardless of the control information transmitted from the eNB 200. For example, the LTE communication or the WLAN communication may be selected for each bearer on the basis of the WLAN measurement information obtained in the UE 100 as described above in the first embodiment.

Sixth Embodiment

The sixth embodiment will be described focusing on a difference with the first embodiment. The sixth embodiment relates to the collocated scenario 2 (see FIG. 6).

(Base Station)

As illustrated in FIG. 6B, in the SeNB 200S according to the sixth embodiment, the bearer #2 of the UE 100 is divided into two bearers by the MeNB 200M (another eNB 200), and downlink data is transferred from the MeNB 200M via one bearer (split bearer) of the two bearers.

The controller 230 of the SeNB 200S selects first downlink data (LTE transmission data) transmitted to the UE 100 through the LTE communication and second downlink data (WLAN transmission data) transmitted to the UE 100 through the WLAN communication among the downlink data transmitted from the MeNB 200M via one split bearer. The LTE communication unit 210 of the SeNB 200S transmits the first downlink data to the UE 100 through the LTE communication. The WLAN communication unit 220 of the SeNB 200S transmits the second downlink data to the UE 100 through the WLAN communication.

In the sixth embodiment, the controller 230 of the SeNB 200S autonomously selects the first downlink data (LTE transmission data) and the second downlink data (WLAN transmission data) on the basis of, for example, the channel state of the WLAN communication regardless of the control information from transmitted the MeNB 200M. A method of detecting the channel state of the WLAN communication is similar to the method described above.

As described above, the SeNB 200S autonomously allocates the downlink data transferred from the MeNB 200M to the LTE transmission data and the WLAN transmission data. Therefore, the MeNB 200M is able to not only transfer the downlink data destined for the UE 100 to the SeNB 200S but it can also ask the SeNB 200S to allocate the LTE transmission data and the WLAN transmission data. The SeNB 200S is able to allocate the LTE transmission data and the WLAN transmission data in accordance with the state of the WLAN communication and the state of LTE communication of the SeNB 200S or the like.

However, it is necessary to adjust the MeNB 200M in regards to an amount of downlink data to be transferred from the MeNB 200M to the SeNB 200S. Therefore, the controller 230 of the SeNB 200S notifies the MeNB 200M of a sum of a buffer accumulation amount of the LTE transmission data and a buffer accumulation amount of the WLAN transmission data (that is, a total buffer accumulation amount). The total buffer accumulation amount may be a total buffer accumulation amount for the UE 100 or a total buffer accumulation amount for the entire eNB 200. Further, the total buffer accumulation amount may be a total buffer accumulation amount for a specific E-RAB. Further, the total buffer accumulation amount may be a desired buffer size calculated in accordance with a buffer amount rather than the buffer amount.

(Example of Operation Sequence)

Figure 18:
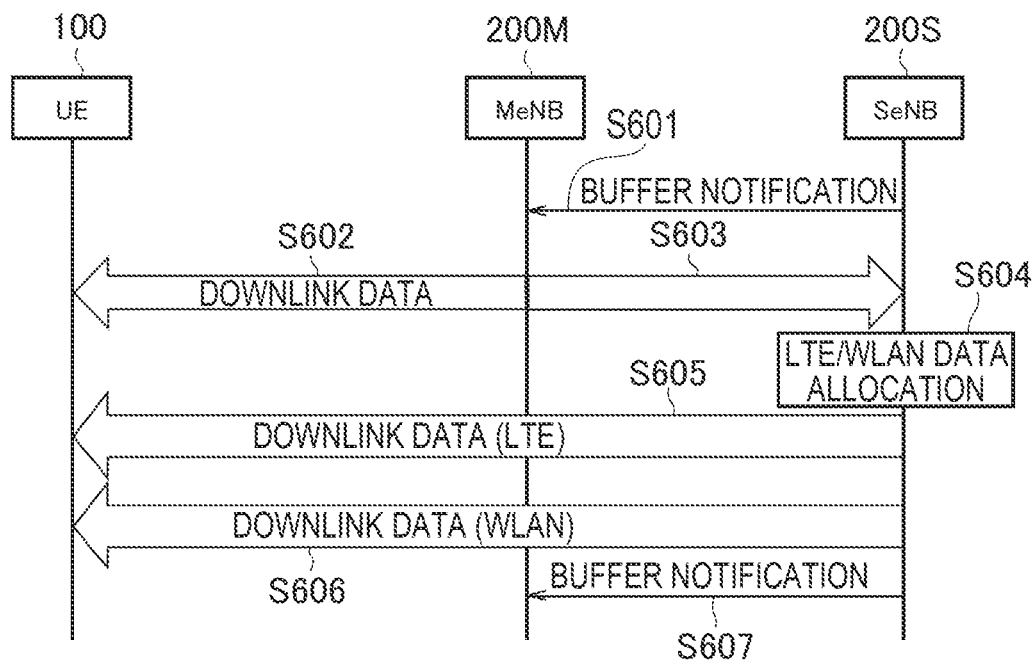
FIG. 18 is a sequence diagram illustrating an example of an operation sequence according to the sixth embodiment.

An example of an operation sequence according to the sixth embodiment will be described below. FIG. 18 is a sequence diagram illustrating an example of an operation sequence according to the sixth embodiment.

As illustrated in FIG. 18, in step S601, the SeNB 200S transmits a buffer notification indicating the total buffer accumulation amount to the MeNB 200M.

In step S602, the MeNB 200M transmits the downlink data to the UE 100.

In step S603, the MeNB 200M transfers the downlink data destined for the UE 100 to the SeNB 200S on the basis of the buffer notification received from the SeNB 200S.

In step S604, the SeNB 200S allocates the LTE transmission data and the WLAN transmission data in accordance with the state of the WLAN communication and the state of LTE communication of the SeNB 200S or the like.

In steps S605 and S606, the SeNB 200S transmits the downlink data to the UE 100 through the LTE communication and the WLAN communication.

In step S607, the SeNB 200S transmits the buffer notification indicating the total buffer accumulation amount to the MeNB 200M. A subsequent operation is similar to steps S602 to S606.

First Modified Example of Sixth Embodiment

In the first modified example of the sixth embodiment, the MeNB 200M allocates the LTE transmission data and the WLAN transmission data instead of the SeNB 200S. Specifically, the controller 230 of the SeNB 200S selects the first downlink data (the LTE transmission data) and the second downlink data (the WLAN transmission data) on the basis of the control information transmitted from the MeNB 200M. Further, the controller 230 of the SeNB 200S notifies the MeNB 200M of the buffer accumulation amount of the LTE transmission data and the buffer accumulation amount of the WLAN transmission data individually.

Figure 19:
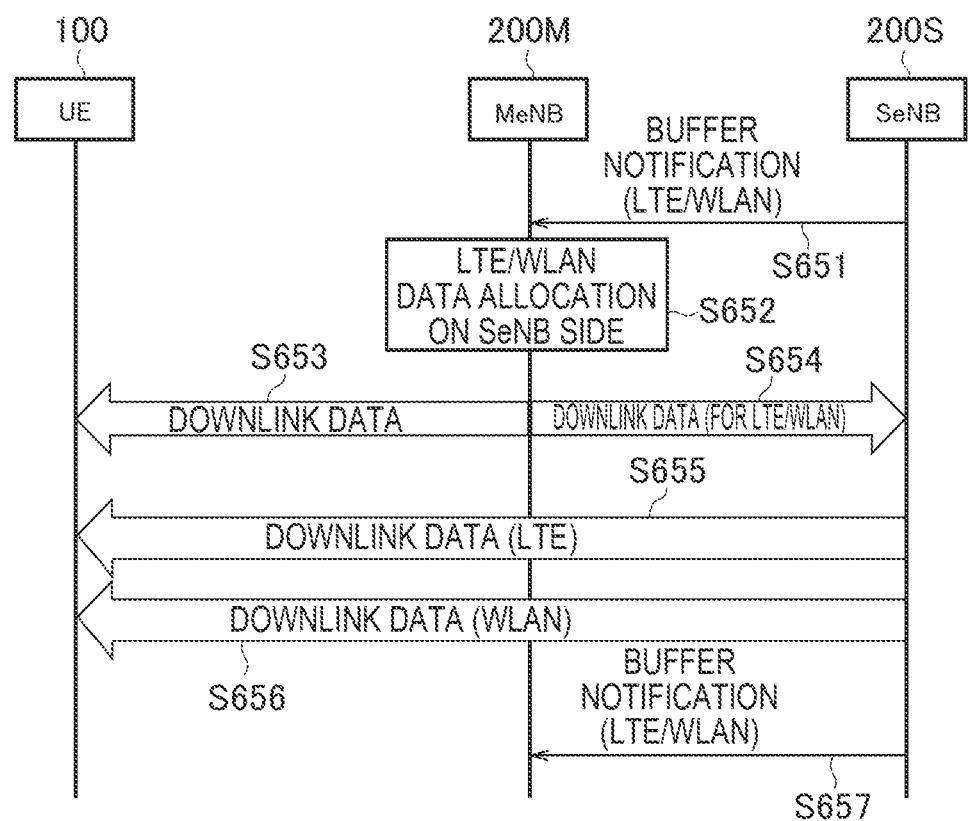
FIG. 19 is a sequence diagram illustrating an example of an operation sequence according to a first modified example of the sixth embodiment.

FIG. 19 is a sequence diagram illustrating an example of an operation sequence according to the first modified example of the sixth embodiment.

As illustrated in FIG. 19, in step S651, the SeNB 200S transmits the buffer notification indicating the buffer accumulation amount of the LTE transmission data and the buffer accumulation amount of the WLAN transmission data individually to the MeNB 200M.

In step S652, the MeNB 200M allocates the LTE transmission data and the WLAN transmission data in the SeNB 200S on the basis of the buffer accumulation amount of the LTE transmission data and the buffer accumulation amount of the WLAN transmission data.

In step S653, the MeNB 200M transmits the downlink data to the UE 100.

In step S654, the MeNB 200M transfers the LTE transmission data and the WLAN transmission data allocated in step S652 to the SeNB 200S. For example, the MeNB 200M assigns an LTE/WLAN identifier indicating the LTE transmission data or the WLAN transmission data to each piece of downlink data (PDCP PDU). Alternatively, the MeNB 200M may notify the SeNB 200S of transmission ratio information indicating a ratio of the LTE transmission data and the WLAN transmission data.

In steps S655 and S656, the SeNB 200S transmits the downlink data to the UE 100 through the LTE communication and the WLAN communication on the basis of the control information (the LTE/WLAN identifier or the transmission ratio information) transmitted from the MeNB 200M.

In step S657, the SeNB 200S transmits the buffer notification indicating the buffer accumulation amount of the LTE transmission data and the buffer accumulation amount of the WLAN transmission data individually to the MeNB 200M. A subsequent operation is similar to steps S652 to S656.

Second Modification Example of the Sixth Embodiment

In a second modified example of the sixth embodiment, in a case in which the WLAN communication is deactivated or activated, the controller 230 of the SeNB 200S notifies the MeNB 200M of information related to a data amount that is transferable from the MeNB 200M to the SeNB 200S.

The controller 230 of the SeNB 200S may notify the UE 100 of the deactivation or the activation of the WLAN communication through a MAC control element (MAC CE) which is MAC layer signaling. Alternatively, the controller 230 of the SeNB 200S may notify the UE 100 of the deactivation or the activation of the WLAN communication through the PDCP control PDU.

The information related to the data amount that is transferable to the SeNB 200S is information related to a transmission buffer of the SeNB 200S. The controller 230 of the SeNB 200S may transmit the buffer notification indicating the buffer accumulation amount of the LTE transmission data and the buffer accumulation amount of the WLAN transmission data individually to the MeNB 200M. Alternatively, the buffer notification indicating the total buffer accumulation amount may be transmitted to the MeNB 200M.

The MeNB 200M performs a process for releasing the SeNB 200S on the basis of the buffer notification transmitted from the SeNB 200S. In other words, the "dual connectivity" ends. The MeNB 200M transmits a release request to the SeNB 200S and transmits a control signal ("RRC Connection Reconfiguration" message) indicating that the SeNB 200S is released to the UE 100. Alternatively, the MeNB 200M may terminate the splitting of the bearer so that the data transfer to the SeNB 200S is stopped.

Seventh Embodiment

The seventh embodiment will be described focusing on a difference with the first to sixth embodiments. The seventh embodiment related to the non-collocated scenario 2 (see FIG. 8).

As illustrated in FIG. 8A, the MeNB 200M according to the seventh embodiment has an X2-U interface which is a direct interface with the SeNB 200S (another eNB 200) and an XW interface which is a direct interface with the WLAN node 500.

The MeNB 200M includes a data transfer unit (the PDCP layers #1 and #2) that splits each of the first bearer (bearer #1) and the second bearer (bearer #2) of the UE 100 into two, transfers the downlink data to the SeNB 200S via one split bearer of the bearer #1, and transfers the downlink data to the WLAN node 500 via one of the split bearers of the bearer #2. The MeNB 200M includes a data transmitter (the RLC layers #1 and #2 and the MAC layer #1) that transmits the downlink data to the UE 100 via the other split bearer of the bearer #1 and transmits the downlink data to the UE 100 via the other split bearer of the bearer #2.

According to this configuration, since the MeNB 200M is able to not only perform transmission from the MeNB 200M to the UE 100 but also transmit the downlink data to the UE 100 using both the SeNB 200S and the WLAN node 500, it is possible to high-speed large-capacity communication to the UE 100.

Eighth Embodiment

The eighth embodiment will be described focusing on a difference with the first to seventh embodiments.

Figure 20A:
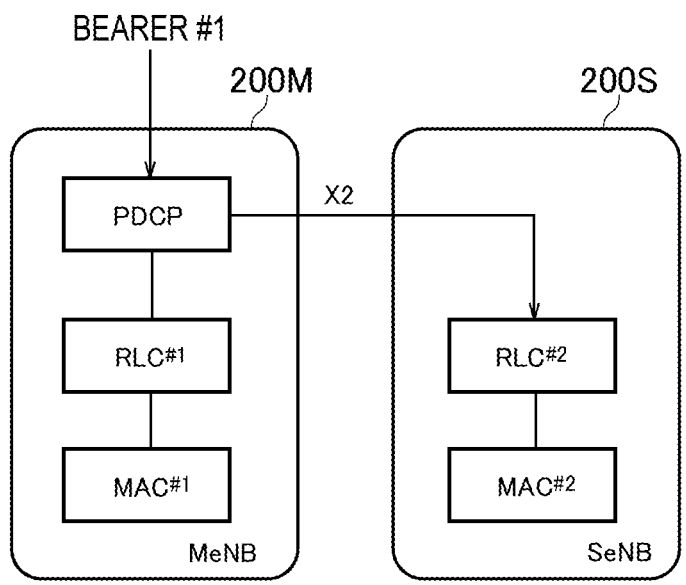
FIGS. 20A and 20B are diagrams for describing an operation overview of the eighth embodiment.
Figure 20B:
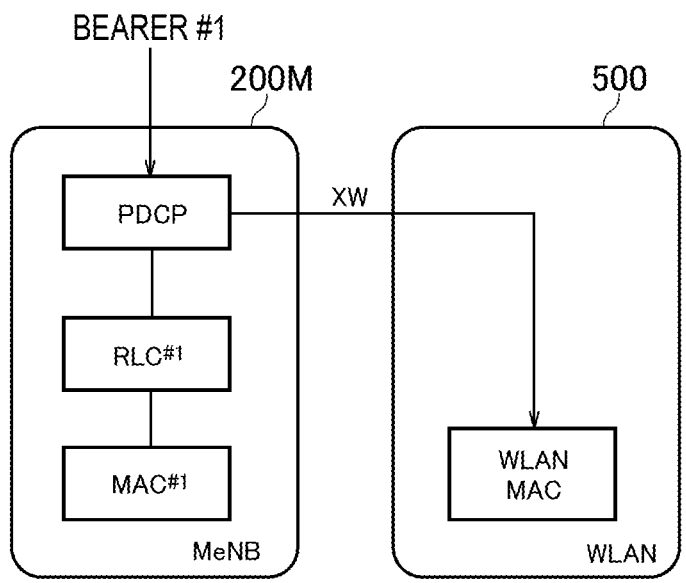

FIGS. 20A and 20B are diagrams for describing an operation overview of the eighth embodiment. The eighth embodiment relates to a change operation from a split bearer configuration illustrated in FIG. 20A to a split bearer configuration illustrated in FIG. 20B.

In the MeNB 200M, the bearer #1 is split into two by the PDCP layer as illustrated in FIG. 20A. Downlink data of one split bearer of the bearer #1 is processed by the entities of the RLC layer #1 and the MAC layer #1 and transmitted to the UE 100 via the LTE physical layer (not illustrated). The other split bearer of the bearer #1 is established via the SeNB 200S. In the SeNB 200S, the downlink data of the other split bearer of the bearer #1 is processed by the RLC layer #2 and the MAC layer #2 and transmitted to the UE 100 via the LTE physical layer (not illustrated).

As described above, the MeNB 200M according to the eighth embodiment has the direct interface (X2-U interface) with the SeNB 200S and the direct interface (XW interface) with the WLAN node 500. The MeNB 200M has a data transfer unit (the PDCP layer) that splits one bearer (bearer #1) of the UE 100 into two and transfers the downlink data to the SeNB 200S via one split bearer of the bearer #1 and a data transmitter (the RLC layer #1 and the MAC layer #1) that transmits the downlink data to the UE 100 via the other split bearer of the bearer #1.

The controller 230 of the MeNB 200M constructs a new split bearer of the bearer #1 with the WLAN node 500 and releases the split bearer going through the SeNB 200S. The data transfer unit (the PDCP layer) stops the data transfer to the SeNB 200S and transfers the downlink data to the WLAN node 500 via the new split bearer. As a result, the new split bearer of the bearer #1 is established via the WLAN node 500 as illustrated in FIG. 20B. In the WLAN node 500, the downlink data of the other split bearer of the bearer #1 is processed by the WLAN MAC layer and transmitted to the UE 100 via the WLAN physical layer (not illustrated).

Figure 21:
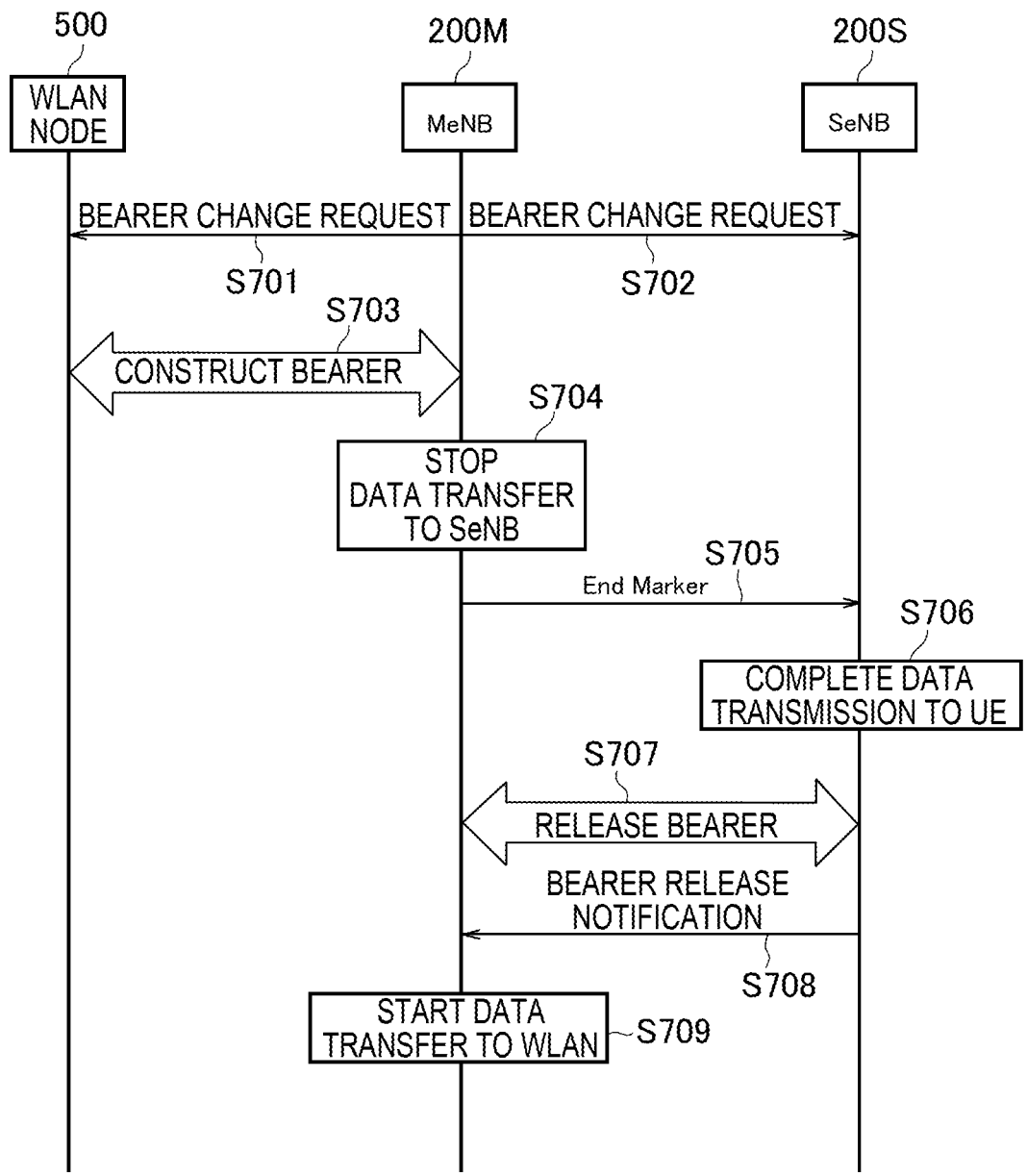
FIG. 21 is a diagram illustrating an example of an operation sequence according to the eighth embodiment.

FIG. 21 is a diagram illustrating an example of an operation sequence according to the eighth embodiment.

As illustrated in FIG. 21, in steps S701 and S702, the MeNB 200M transmits a bearer change request to the WLAN node 500 and the SeNB 200S. Specifically, the MeNB 200M requests the WLAN node 500 to construct a new split bearer, and requests the SeNB 200S to release the split bearer. Alternatively, the MeNB 200M may transmit the bearer change request only to the SeNB 200S, and the SeNB 200S may transmit the bearer change request to the WLAN node 500 accordingly. In this case, an address information of the WLAN node 500 is included in the bearer change request transmitted from the MeNB 200M to the SeNB 200S. The SeNB 200S transmits the bearer change request to the WLAN node 500 on the basis of the address information.

In step S703, the WLAN node 500 constructs the new split bearer with the MeNB 200M.

In step S704, the MeNB 200M stops the data transfer to the SeNB 200S. In step S705, the MeNB 200M transmits a transfer end notification (End Marker) for the last data to be transferred to the SeNB 200S.

In step S706, the SeNB 200S completes data transmission to the UE 100. In step S707, the SeNB 200S releases the split bearer with the MeNB 200M. Then, the SeNB 200S notifies the MeNB 200M of the bearer release (step S708).

In step S709, the MeNB 200M starts the data transfer to the WLAN node 500. Step S709 has been described as being performed after the step S708 as an example but may be performed at any timing as long as it is performed after the step S704.

As described above, according to the eighth embodiment, it is possible to seamlessly change the form of the split bearer.

Ninth Embodiment

The ninth embodiment will be described focusing on a difference with the first embodiment to the eighth embodiment.

(Protocol Architecture)

In the ninth embodiment, two protocol architectures including an option 3C and an option 2C are assumed for the LTE-WLAN aggregation (WWAN-WLAN aggregation). The option 3C is a protocol architecture similar to the non-collocated scenario 1 (see FIG. 7). On the other hand, the option 2C is different from the protocol architecture described above.

(1) Option 3C

Figure 22:
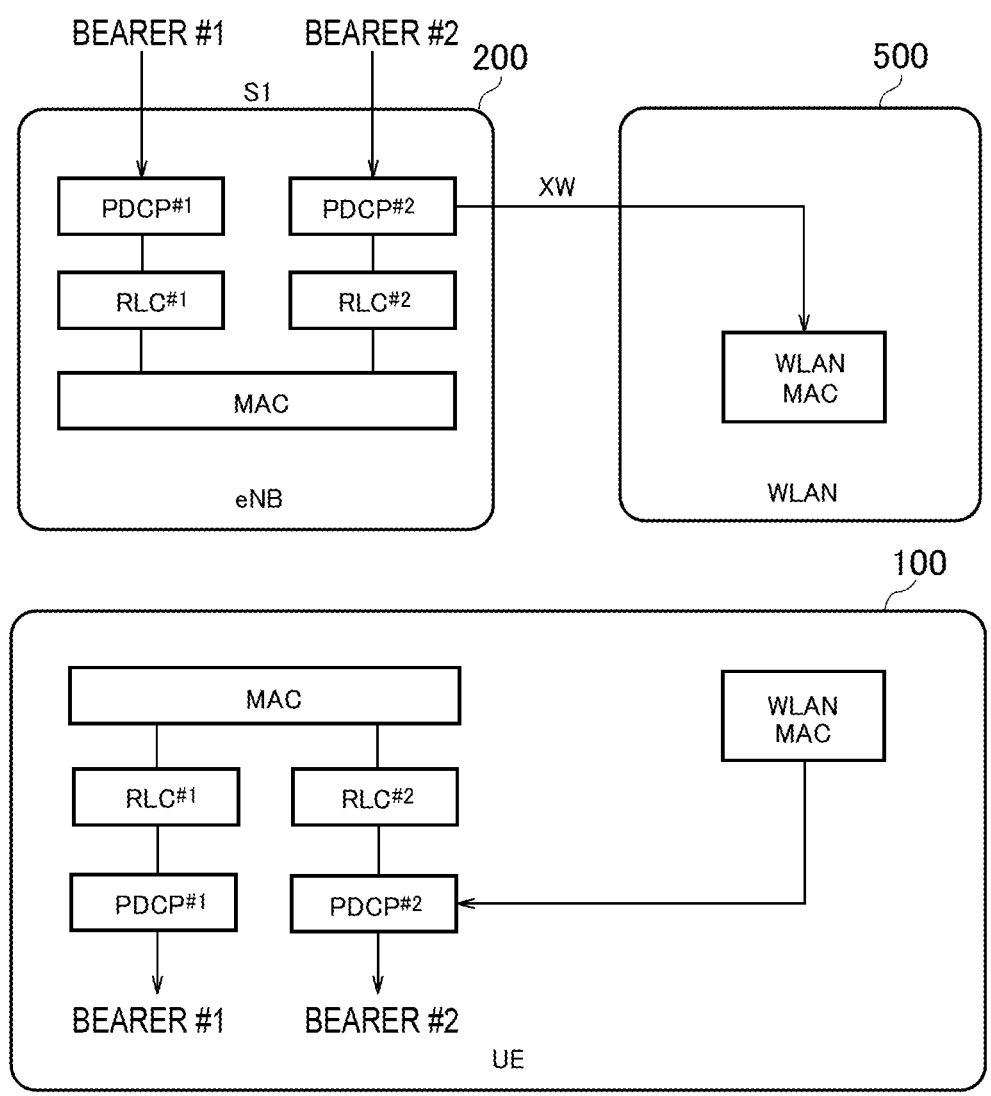
FIG. 22 is a diagram for describing an option 3C (first function) according to the ninth embodiment.

FIG. 22 is a diagram for describing the option 3C (first function) according to the ninth embodiment.

The eNB 200 has the entities of the LTE protocol as illustrated in FIG. 22. The WLAN node 500 has the entities of the WLAN protocol. Here, two bearers #1 and #2 are assumed to be established between the UE 100 and the S-GW 300.

In the eNB 200, the downlink data of the bearer #1 is processed by the entities of the PDCP layer #1, the RLC layer #1, and the MAC layer and transmitted to the UE 100 via the LTE physical layer (not illustrated). The bearer #2 is split into two by the PDCP layer #2. In other words, the PDCP layer #2 allocates the PDCP PDUs to the LTE path and the WLAN path (routing). Downlink data of one split bearer of the bearer #2 is processed by the entities of the RLC layer #2 and the MAC layer and transmitted to the UE 100 via the LTE physical layer (not illustrated).

On the other hand, the other split bearer of the bearer #2 is established via the WLAN node 500. In the WLAN node 500, downlink data of the other split bearer of the bearer #2 is processed by the WLAN MAC layer and transmitted to the UE 100 via the WLAN physical layer (not illustrated).

In the UE 100, the downlink data of the bearer #1 is received via the LTE physical layer (not illustrated) and processed by the entities of the MAC layer, the RLC layer #1, and the PDCP layer #1. The downlink data of one split bearer (LTE path) of the bearer #2 is received through the LTE physical layer (not illustrated), processed by the entities of the MAC layer, the RLC layer #2, and the PDCP layer #2, and then transferred to the upper layer. The downlink data of the other split bearer (WLAN path) of the bearer #2 is received through the WLAN physical layer (not illustrated), processed by the WLAN MAC layer, and then transferred to the PDCP layer #2. The downlink data (PDCP PDU) of the LTE path and the downlink data (PDCP PDU) of the WLAN path are subjected to a rearrangement process (PDCP reordering) in the PDCP layer #2 and then transferred to the upper layer.

Here, the operation in the downlink has been described, but an operation opposite to the operation in the downlink is performed in the uplink. In other words, the PDCP layer #2 of the UE 100 splits the bearer #2 into two (routing), and the PDCP layer #2 of eNB 200 performs the PDCP reordering.

(2) Option 2C

Figure 23:
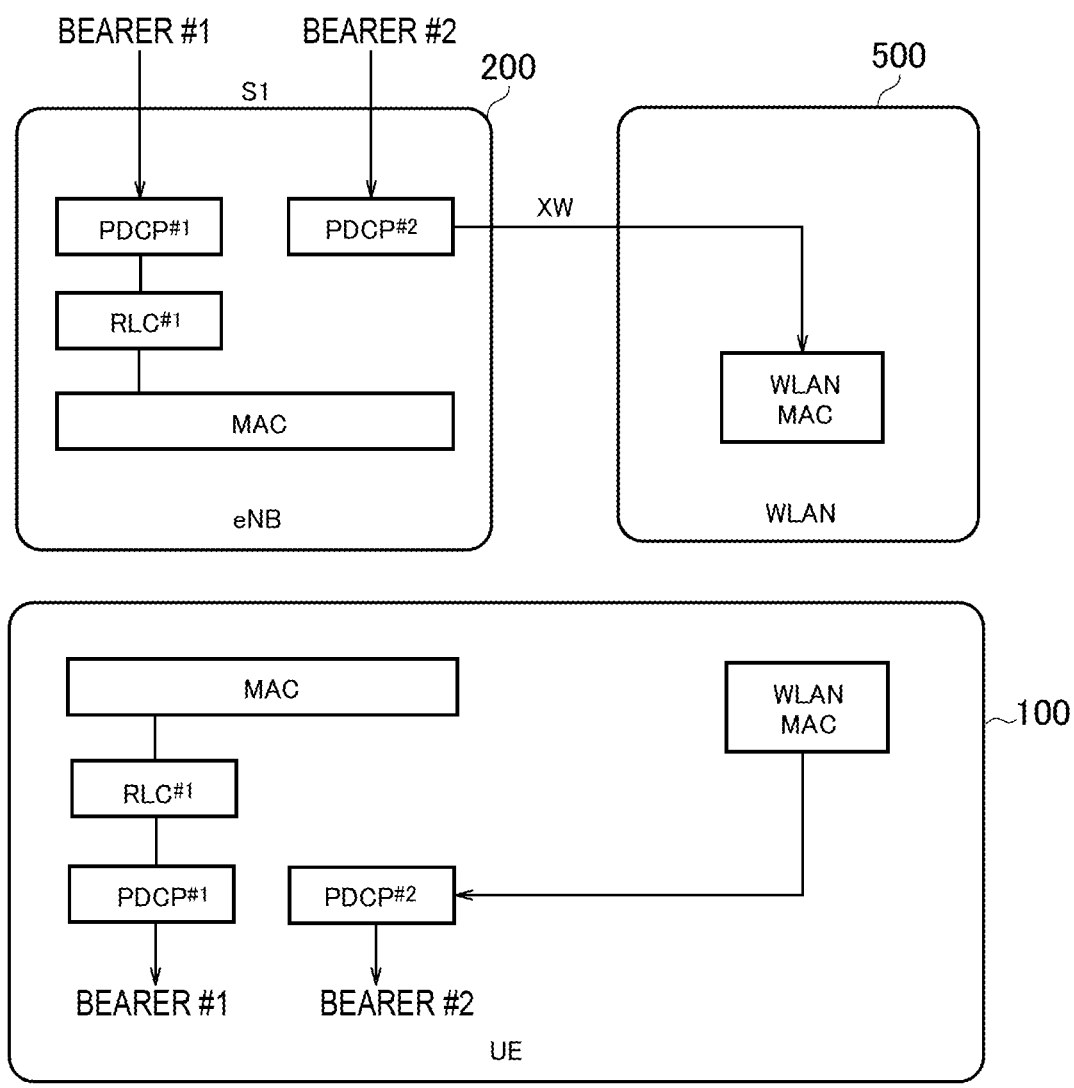
FIG. 23 is a diagram for describing an option 2C (second function) according to the ninth embodiment.

FIG. 23 is a diagram for describing the option 2C (second function) according to the ninth embodiment. Here, the description will proceed with a difference with the option 3C.

An operation of the bearer #1 is similar to that of the option 3C as illustrated in FIG. 23.

In the eNB 200, the bearer #2 is not split into two by the PDCP layer #2. The PDCP layer #2 transfers the downlink data (PDCP PDU) to the WLAN node 500. In the WLAN node 500, the downlink data transferred from the PDCP layer #2 is processed by the WLAN MAC layer and then transmitted to the UE 100 via the WLAN physical layer (not illustrated).

In the UE 100, the downlink data of the bearer #2 is received through the WLAN physical layer (not illustrated) and processed by the WLAN MAC layer, and then the downlink data (PDCP PDU) of the WLAN path is processed in the PDCP layer #2 and then transferred to the upper layer.

Here, the operation in the downlink has been described, but for the uplink, an operation opposite to the operation in the downlink is performed.

(3) Comparison of Option 3C and Option 2C

In the option 3C, the PDCP reordering is necessary in the UE 100 and the eNB 200, but in the option 2C, the PDCP reordering is not required. For this reason, in the option 3C, a large buffer for the PDCP reordering is necessary. Further, it takes time to perform the PDCP reordering due to a delay time of the XW interface. In the option 2C, the problem related to the PDCP reordering does not occur.

The option 2C can be regarded as a special case in the option 3C. Specifically, in the option 3C, when the data ratio between the LTE path and the WLAN path (LTE path: WLAN path) is set to 0:100, a result similar to that in the option 2C is obtained. However, since a large-capacity reordering buffer is not necessary in the option 2C, it is preferable to divide the performance required in the UE 100 between the option 2C and the option 3C.

Operation Related to Ninth Embodiment

In the ninth embodiment, it is possible to deal with the option 3C and the option 2C individually while using the option 3C and the option 2C together. Accordingly, it is possible to use the merits of the option 3C and the option 2C. Further, the performance required for the UE 100 is able to be divided between the option 2C and the option 3C.

As described above, in the option 3C (first function), the bearer of the UE 100 is divided in the PDCP layer of the LTE communication, and the LTE communication and the WLAN communication are used for the radio communication of the bearer. In the option 2C (second function), only the WLAN communication is used for the radio communication of the bearer without dividing the bearer going through the PDCP layer.

In the ninth embodiment, an acknowledged mode (AM) and an unacknowledged mode (UM) are allowed for the bearer in which the option 2C is configured. On the other hand, only the AM mode is allowed for the bearer in which the option 3C is configured. It is because in the option 3C, it takes a time to perform the PDCP reordering, and thus it should not be applied to data of a streaming system (that is, data suitable for the UM mode). In the option 2C, since the PDCP reordering is not performed, the UM mode should be allowed in addition to the AM mode. However, in the case of the option 2C, in the non-collocated scenario, a delay occurs when it goes through the XW interface, and thus the UM should not be configured. For this reason, in the case of the option 2C, the eNB 200 may determine whether or not it is possible to configure the UM in accordance with whether or not it goes through the XW interface.

(1) Capability Information Acquisition Operation

Figure 24:
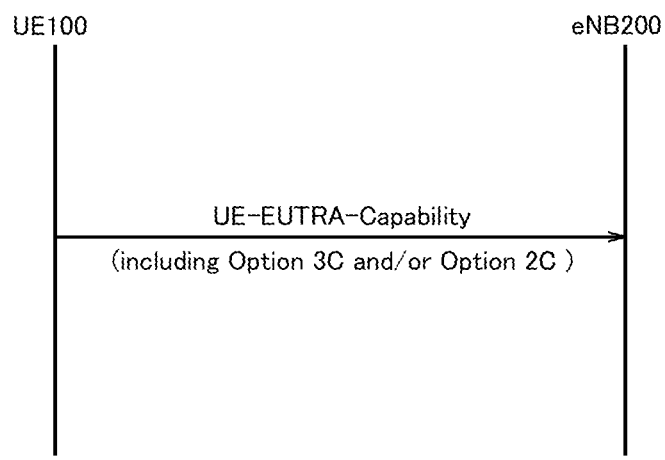
FIG. 24 is a diagram for describing an operation of acquiring capability information according to the ninth embodiment.

FIG. 24 is a diagram, which describes an operation for capability information acquisition according to the ninth embodiment.

As illustrated in FIG. 24, the controller 130 of the UE 100 notifies the eNB 200 of capability information (UE-EUTRA-Capability) indicating the functions of the UE 100 (that is, the functions supported by the UE 100). The "UE-EUTRA-Capability" is a sort of RRC message.

The controller 130 of the UE 100 notifies of the capability information of the option 2C (second function) as information different from the capability information of the option 3C (first function). In other words, the "UE-EUTRA-Capability" is configured to be able to indicate "having the function of the option 3C" and that "having the function of the option 2C" separately.

The controller 230 of the eNB 200 acquires the "UE-EUTRA-Capability" from the UE 100. While the UE 100 is in the attached state, the "UE-EUTRA-Capability" is held in the MME 300. Therefore, the controller 230 of the eNB 200 may acquire the "UE-EUTRA-Capability" from the MME 300 instead of acquiring the "UE-EUTRA-Capability" from the UE 100.

As described above, according to the capability information acquiring operation related to the ninth embodiment, the eNB 200 is able to detect that the UE 100 has the function of the option 3C and/or the function of the option 2C.

(2) RRC Configuration Operation

Figure 25A:
FIGS. 25A and 25B are for describing an RRC (re) configuration operation according to the ninth embodiment.
Figure 25B:
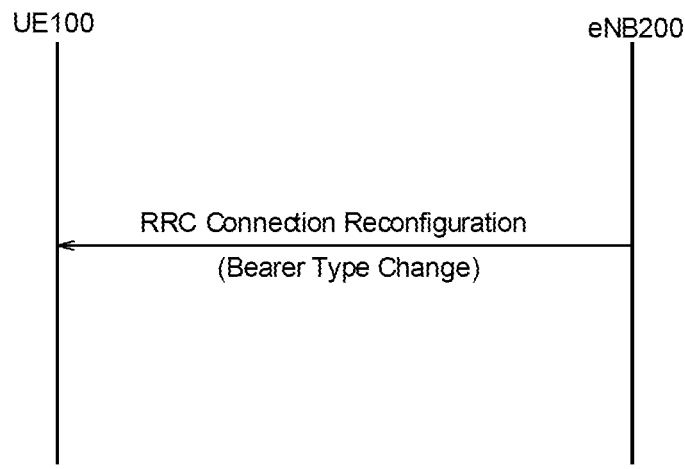

FIGS. 25A and 25B are for describing an RRC (re)configuration operation according to the ninth embodiment.

The controller 230 of the eNB 200 is able to configure both the bearer in which the option 3C is configured and the bearer in which the option 2C is configured in the UE 100 that supports both the option 3C and the option 2C as illustrated in FIG. 25A. For example, an individual RRC message including the configuration information (configuration) of each of the option 3C and the option 2C is transmitted from the eNB 200 to the UE 100. The controller 130 of the UE 100 performs a process of receiving the individual RRC message. The individual RRC message is, for example, the "RRC Connection Reconfiguration" message.

As described above, the option 3C and the option 2C are simultaneously configured in one UE 100. Accordingly, the UE 100 is able to simultaneously use the bearer in the AM mode in which the option 3C is configured and the bearer in the UM mode in which the option 2C is configured.

Further, in the ninth embodiment, it is possible to change the configuration of the bearer between the option 3C and the option 2C. The controller 230 of the eNB 200 performs a process of transmitting change information (Bearer Type Change) for changing the configuration of the bearer between the option 3C and the option 2C to the UE 100 that supports both the option 3C and the option 2C as illustrated in FIG. 25B. For example, an individual RRC message including information for giving an instruction to change from the option 3C to the option 2C or information for giving an instruction to change from the option 2C to the option 3C is transmitted from the eNB 200 to the UE 100. The controller 130 of the UE 100 performs the process of receiving the individual RRC message. The individual RRC message is, for example, the "RRC Connection Reconfiguration" message. Accordingly, it is possible to switch whether the option 3C or the option 2C is applied to one bearer.

However, in a case in which the configuration of the bearer is changed from the option 2C to the option 3C, the controller 230 of eNB 200 performs a process of transmitting configuration information for the option 3C together with the change information (Bearer Type Change). For example, the configuration information for the option 3C is included in the individual RRC message ("RRC Connection Reconfiguration" message). Here, the configuration information for the option 3C is a reordering timer value to be configured in the PDCP layer (the PDCP layer #2) of the UE 100. Alternatively, the configuration information for the option 3C is a parameter value to be configured in the physical layer, the MAC layer, and/or the RLC layer (the RLC layer #2) of the UE 100.

In the case in which the configuration of the bearer between the option 3C and the option 2C is changed, the following operations 1) to 3) may be performed.

1) A PDCP SN (Sequence Number) value and a security key are held without change. Accordingly, it is possible to effectively utilize data (PDCP PDU) that has already been transferred to the WLAN side (particularly, perform the PDCP reordering), particularly, in a case in which the configuration of the bearer is changed from the option 2C to the option 3C. Further, particularly in a case in which the configuration of the bearer is changed from the option 3C to the option 2C, it is possible to transfer the PDCP PDU that is not transmitted on the LTE side to the WLAN side without change and perform the PDCP reordering.

2) In the operation 1), the PDCP on the reception side is temporarily subject to the reordering function for the change from the option 3C to the option 2C. For example, it ends if data is received side by side in order or ends if a certain timer value is set and expires.

3) Accordingly, data (PDCP PDU or SDU) which has not been transmitted to the upper layer is held.

Tenth Embodiment

The tenth example will be described focusing on a difference with the first to ninth embodiments.

Overview of Tenth Embodiment

As described above, in the collocated scenario, the WLAN communication entity disposed in the eNB 200 receives the downlink data (PDCP PDU) transferred from the PDCP layer disposed in the eNB 200 and transmits the downlink data to the UE 100 through the WLAN communication. Here, the "WLAN communication entity" is an entity configured with a WLAN MAC layer. However, the "WLAN communication entity" may include the entity of the WLAN LLC (Logical Link Control) layer. In the non-collocated scenario, the WLAN communication entity disposed in the WLAN node 500 receives the downlink data (PDCP PDU) transferred from the PDCP layer disposed in the eNB 200, and transmits the downlink data to the UE 100 through the WLAN communication.

In the uplink, the WLAN communication entity disposed in the UE 100 receives the uplink data (PDCP PDU) transferred from the PDCP layer disposed in the UE 100, and transmits the uplink data to the eNB 200 or the WLAN node 500 through the WLAN communication.

On the other hand, the following functions 1 to 4 are specified in the LTE specification as functions which the PDCP layer expects from the lower layer (the RLC layer).

1. Acknowledged type data transfer service. A PDCP PDU delivery success notification (Successful delivery indication) is included.

2. Unacknowledged type data transfer service.

3. In-sequence delivery, except when the lower layer is re-established.

4. Duplicate data discarding (duplicate discarding), except when the lower layer is re-established.

However, in the LTE-WLAN aggregation communication, the lower layer of the PDCP layer is able to function as a WLAN communication entity (WLAN MAC/LLC) other than the lower layer (RLC) in LTE. In this case, the function that the PDCP layer expects from the lower layer may not be provided through the WLAN communication entity.

In this regard, in the tenth embodiment, in a case in which data (PDCP PDU) is transferred from the PDCP layer of the LTE communication to the WLAN communication entity, control is performed such that the function of the WLAN communication entity is compensated so that the function expected from the lower layer in LTE is provided to the PDCP layer. Hereinafter, an entity that performs such control is referred to as a "termination entity (TE)." In the tenth embodiment, the TE provides the above-mentioned functions 1 to 4 to the PDCP layer without changing the specification of the WLAN communication and the specification of the PDCP layer.

(Arrangement Example of TE)

Figure 26:
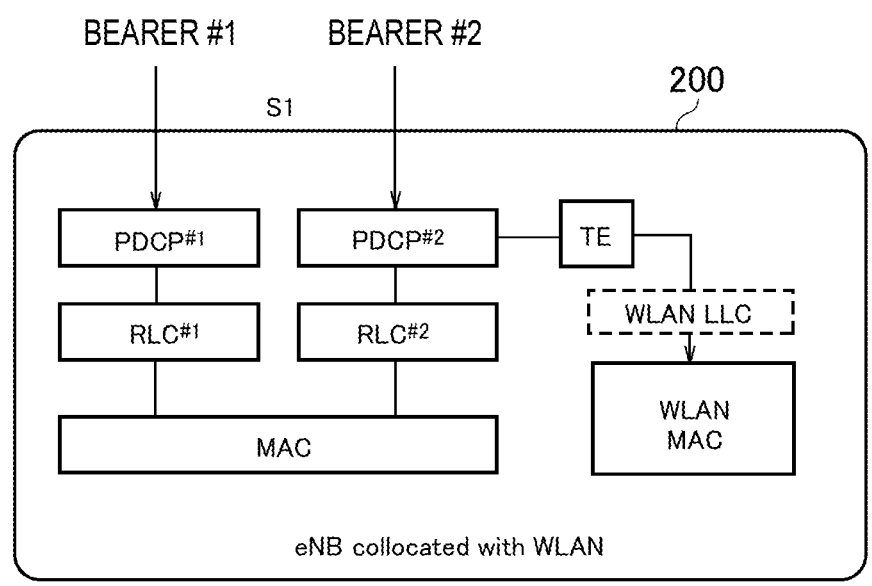
FIG. 26 is a diagram illustrating a first arrangement example of a TE according to the tenth embodiment.

FIG. 26 is a diagram illustrating a first arrangement example of the TE according to the tenth embodiment. In the first arrangement example, in the collocated scenario, the TE is disposed in the eNB 200 as illustrated in FIG. 26. The eNB 200 includes the WLAN communication entity (WLAN MAC/LLC) and the PDCP layer (the PDCP layer #2) that transfers the downlink data (PDCP PDU) to the WLAN communication entity. The TE is arranged between the WLAN communication entity (WLAN MAC/LLC) and the PDCP layer (the PDCP layer #2). The function of the TE is executed by the controller 230 of the eNB 200.

Figure 27:
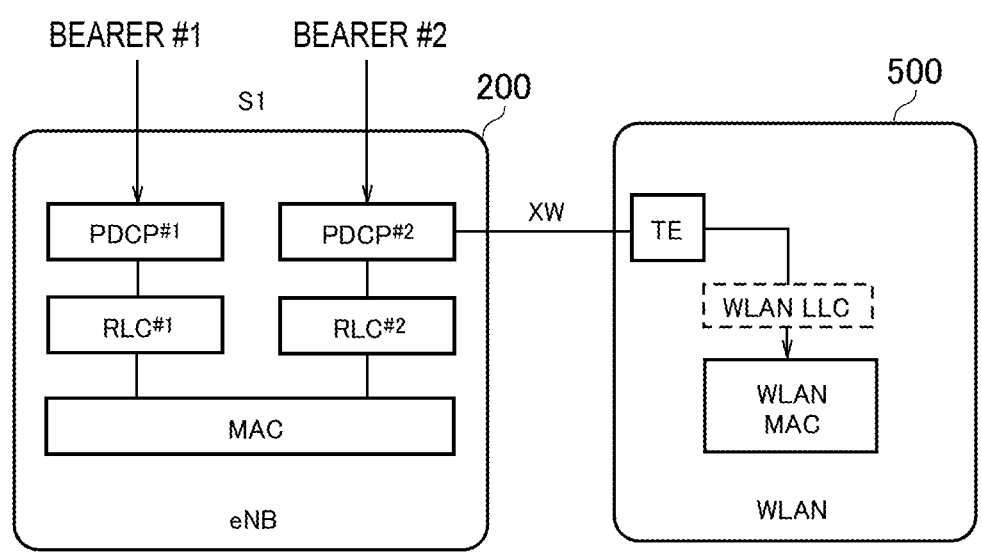
FIG. 27 is a diagram illustrating a second arrangement example of TE according to the tenth embodiment.

FIG. 27 is a diagram illustrating a second arrangement example of the TE according to the tenth embodiment. In the second arrangement example, in the non-collocated scenario, the TE is provided in the WLAN node 500 as illustrated in FIG. 27. The WLAN node 500 includes the WLAN communication entity (WLAN MAC/LLC). The eNB 200 includes the PDCP layer (the PDCP layer #2) that transfers the downlink data (PDCP PDU) to the WLAN communication entity. The TE is arranged at the end of the XW interface in the WLAN node 500. The function of the TE is executed by the controller of the WLAN node 500.

Figure 28:
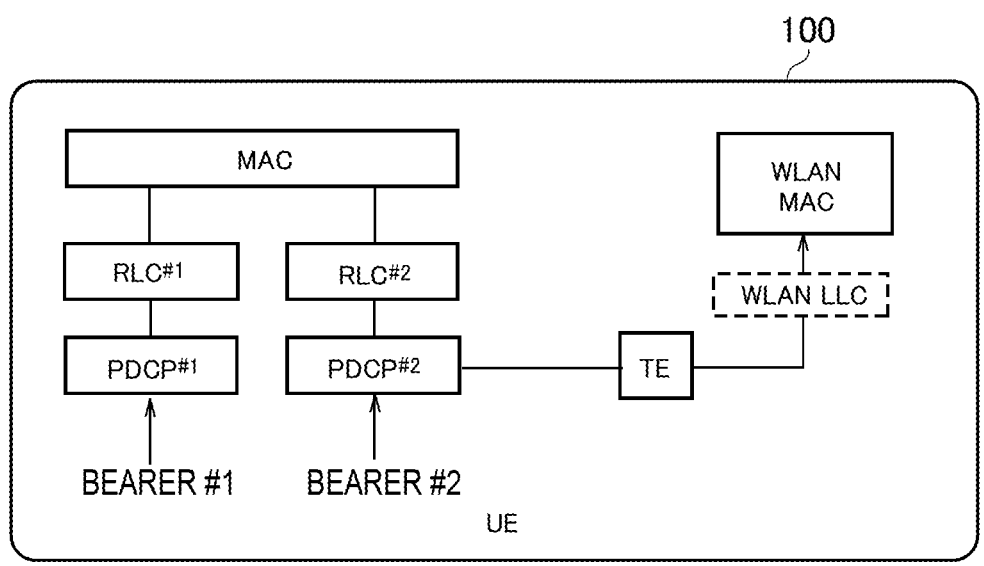
FIG. 28 is a diagram illustrating a third arrangement example of TE according to the tenth embodiment.

FIG. 28 is a diagram illustrating a third arrangement example of the TE according to the tenth embodiment. In the third arrangement example, the TE is disposed in the UE 100 as illustrated in FIG. 28. The UE 100 includes the WLAN communication entity (WLAN MAC/LLC) and the PDCP layer (the PDCP layer #2) that transfers the uplink data (PDCP PDU) to the WLAN communication entity. The TE is arranged between the WLAN communication entity (WLAN MAC/LLC) and the PDCP layer (the PDCP layer #2). The function of the TE is executed by the controller 130 of the UE 100.

(Specific Example of Operation of TE)

A specific example of an operation of the TE that provides the functions 1 to 4 to the PDCP layer will be described.

(1) Acknowledged type data transfer service. A "Successful delivery indication" is included.

The WLAN communication entity performs a process of transmitting data transferred from the PDCP layer through the WLAN communication. The TE monitors the data transmission state in the WLAN communication entity and provides the PDCP layer with a transmission completion notification (Successful delivery indication) that can be interpreted by the PDCP layer.

For example, the WLAN MAC layer supports a function of transmitting an Ack from the reception side to the transmission side. The TE monitors an Ack reception state for each PDCP PDU, generates the "Successful delivery indication" each time the transmission of the PDCP PDU is determined to be completed, and notifies the PDCP layer of the "Successful delivery indication."

(2) Unacknowledged Type Data Transfer Service.

In a case in which data of the bearer in which the unacknowledged mode (UM) is configured in the LTE communication is transferred from the PDCP layer to the WLAN communication entity, the TE operates the WLAN communication entity in the unacknowledged mode (UM) in the WLAN communication.

For example, the WLAN MAC layer supports a mode in which the Ack is not required (that is, the UM) and operates in the UM in accordance with a predetermined parameter. In a case in which the UM bearer is configured, the TE sets the predetermined parameter to an appropriate value and operates the WLAN MAC layer in the UM.

Further, the TE may set a parameter related to QoS control of the WLAN to an appropriate value in accordance with a QoS related setting from the RRC layer.

(3) In-Sequence Delivery

The case in which the lower layer is re-established is excluded.

In the tenth embodiment, in the case in which an instruction to re-establish the WLAN communication is given from the RRC layer of the LTE communication, the TE performs at least one of discarding of the data held in the WLAN communication entity and initialization of the parameter set in the WLAN communication entity.

In the LTE specification, the following operations are specified as an operation expected in the RLC layer for the re-establishment.

For the UM/AM bearer, the reception side reassembles data if possible, transfers it to the upper layer, and discards the remaining data.

For UM/AM bearer, the transmission side discards all data.

All timers are stopped and reset.

All variables are initialized.

For example, in the case in which the re-establishment instruction is given from the RRC layer, the TE poses as the upper layer (for example, the WLAN LLC layer) of the WLAN MAC layer so that a similar operation to that in the RLC layer is performed as possible as it can, and transfers the instruction to the WLAN MAC layer. Specifically, an instruction to return to discarding of all data of the WLAN and initialization of all parameters (timers and variable) is given.

(4) Duplicate data discarding (duplicate discarding), except when the lower layer is re-established.

The TE operates the WLAN communication entity so that a duplicate data discarding operation is performed in the WLAN communication. For example, the WLAN MAC layer supports the duplicate data discarding operation. Therefore, when a parameter related to the duplicate data discarding operation is set to an appropriate value, and it poses as the upper layer (for example, the WLAN LLC layer) of the WLAN MAC layer, the WLAN MAC layer performs the duplicate data discarding operation.

Modified Example of Tenth Embodiment

In the tenth embodiment described above, the example in which the TE is disposed outside the PDCP layer has been described, but the PDCP layer may support the function of the TE. Specifically, the function of the TE is specified as a function of the PDCP layer, and the PDCP layer executes the function of the TE.

Other Embodiments

The first to tenth embodiments may be implemented independently, or two or more embodiments may be implemented in combination.

Figure 29:
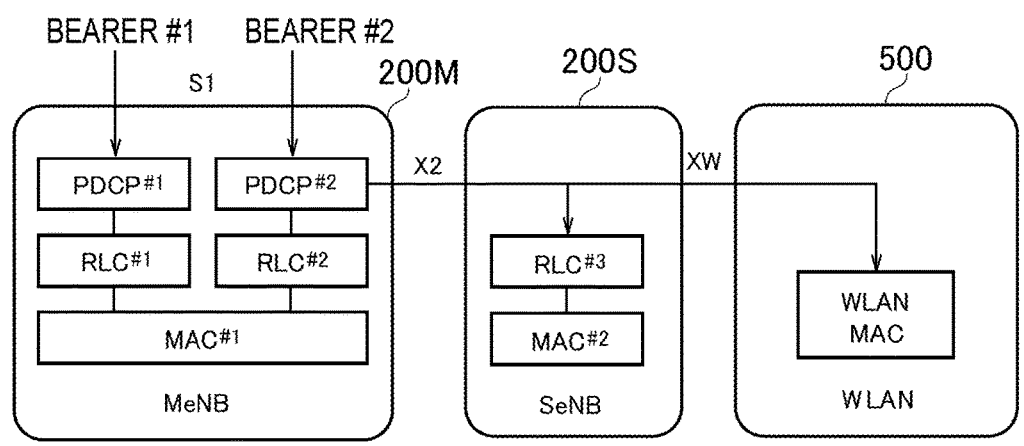
FIG. 29 is a diagram illustrating a modified example of the non-collocated scenario 3.

FIG. 29 illustrates a way that the protocol stack of the non-collocated scenario 3 (see FIG. 9B) may be changed. Two bearers #1 and #2 are established between the UE 100 and the S-GW 300 as illustrated in FIG. 29. In the MeNB 200M, downlink data of the bearer #1 is processed by the entities of the PDCP layer #1, the RLC layer #1, and the MAC layer #1 and transmitted to the UE 100 via the LTE physical layer (not illustrated). In the MeNB 200M, the bearer #2 is split into two by the PDCP layer #2. Downlink data of one split bearer of the bearer #2 is processed by the entities of the RLC layer #2 and the MAC layer #1 and transmitted to the UE 100 via the LTE physical layer (not illustrated). The other split bearer of the bearer #2 is established via the SeNB 200S and the WLAN node 500. In the SeNB 200S, part of the downlink data of the other split bearer of the bearer #2 is processed by the RLC layer #3 and the MAC layer #2 and transmitted to the UE 100 via the LTE physical layer (not illustrated). Further, the remaining part of the downlink data of the other split bearer of the bearer #2 is processed by the WLAN MAC layer in the WLAN node 500 and transmitted to the UE 100 via the WLAN physical layer (not illustrated).

In each of the embodiments, the LTE system has been described as an example of the mobile communication system, and the LTE communication has been described as an example of the WWAN communication. However, the present disclosure is not limited to the LTE system. The present disclosure may be applied to mobile communication systems other than the LTE system. IEEE 802.11 has been described as an example of the WLAN communication, but the present disclosure is not limited to IEEE 802.11.

[Additional Note 1]

Supplementary notes of the above-described embodiments will be described below.

(Introduction)

The highest priority is given to a discussion about a scenario and requirements by the rapporteurs. However, since the data flow depends on how the eNB/WLAN is deployed, it is difficult to discuss a deployment scenario separately from the user plane architecture. This additional note explains how the RAN 2 should standardize a protocol in view of a possible deployment scenario.

(Bearer Type)

Figure 30:
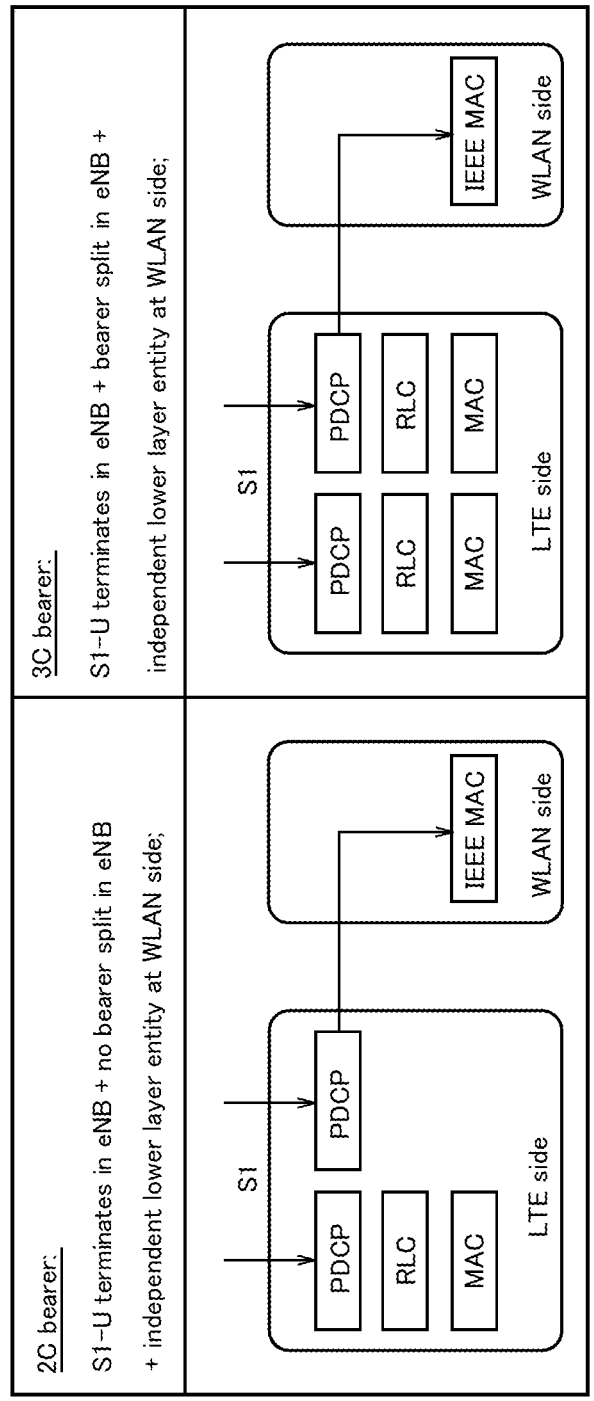
FIG. 30 is a diagram relating to an additional note.

It is one of objects of the RAN 2 for this WID is to standardize a RAN and a WLAN protocol architecture on the basis of the LTE dual connectivity bearer types 2C and 3C of the bearer release 12. The bearer types 2C and 3C have been introduced in a small cell enhancement technical report. The RAN 2 should define each bearer type on the basis of a result of SI. FIG. 30 illustrates an example of the data flow focusing on the downlink. This table illustrates that the PDCP PDU is able to be delivered to the WLAN side through both bearer types regardless of whether or not it is collocated or non-collocated in the same place. In the case of the collocated, the WLAN side is physically integrated and connected to the LTE side. In the case of the non-collocated, these sides are connected via an external direct interface.

(Comparison Between 2C and 3C)

Is 2C a Special Case of 3C?

A difference between the 2C bearer and the 3C bearer is whether or not the bearer is split, that is, whether or not there is a reordering function. Since reordering is necessary, the 3C option requires a larger buffer size than the 2C option. A function to be required differs between 2C and 3C. From this point of view, 2C is not a special case of 3C (that is, a split ratio 100%/0%). There are cases in which some UEs correspond to 2C and do not correspond to 3C. The RAN 2 should define these solutions as different functions.

Proposal 1: The RAN 2 should agree to think that 2C is not a special case of 3C.

Support for Acknowledged Response Data Transfer/Unacknowledged Response Data Transfer It may not be preferable for the 3C bearer option to support the unacknowledged response data transfer (such as the UM), particularly, in the case of the non-collocated. This is because the data transfer is unable to accept a delay caused by the reordering.

On the other hand, the 2C bearer option does not require the reordering process. Packets are sequentially delivered from/to the UE via the WLAN. It is reasonable for the 2C bearer option to support both the acknowledged response and the unacknowledged response data transfer at least in the case of the collocated.

Proposal 2: The 2C bearer option should support UM type data transfer at least in the case of the collocated scenario.

Can 2C and 3C be Configured Simultaneously?

In a case in which the proposal 1 is agreed, it is unclear if it is possible for 2C and 3C to be simultaneously configured in the UE. In Rel-12 DC, it is not allowed to simultaneously configure the split bearer and the SCG bearer. Unlike Rel-12 DC, there is no difference in architecture between the 2C bearer option and the 3C bearer option. In a case in which it is possible to simultaneously configure the 2C and 3C bearer type options, it is possible to offload both the UM type bearer and the AM type bearer to the WLAN. It is reasonable to allow the simultaneous configuration in order to achieve QoE improvement described as legitimation of the WID.

Proposal 3: The RAN 2 should discuss whether or not it is allowed to simultaneously configure the solutions 2C and 3C.

(Overall Architecture for LTE-WLAN Aggregation)

For both the collocated scenario and the non-collocated scenario, the RAN 2 has requirements that the LTE-WLAN aggregation be transparent to the EPC. In terms of this, the WLAN AP/AC should be collocated in the eNB or connected directly to the eNB. It should not be considered that there is another direct interface between 3GPP nodes (for example, the S-GW and the MME). Here, this external direct interface is referred to as "Xw."

The RAN 2 is able to obtain a preliminary assumption of the overall architecture for the WLAN/3 GPP aggregation (FIG. 4).

Several WLAN deployment scenarios can be discussed from FIG. 4.

1. Collocated in eNB
2. Non-collocated/connection with MeNB
3. Collocated in SeNB In the following, only solution (c) is explicitly illustrated as an example of a protocol stack.

(Collocated in eNB)

FIGS. 5A and 5B: Case of WLAN collocated in eNB.

This is the simplest case. The WLAN is collocated in the eNB. If the fact that the coverage size of the WLAN is small is considered, then it is natural for the WLAN to be physically integrated into a small cell eNB. This collocated scenario is applied most likely to a small cell standalone operation. In this scenario, the WLAN should be used as a secondary serving cell as in the SCell of the carrier aggregation operation. The LTE should set the PCell as in the current carrier aggregation.

This scenario has been implicitly agreed since it is an object of the WI to standardize the collocated scenario.

Proposal 4: The RAN 2 should agree with a scenario in which the eNB is arranged at the same position as the WLAN.

(Non-Collocated/Connection with MeNB)

FIGS. 7A and 7B: Case of WLAN non-collocated/connection with MeNB. This is one of main deployment scenarios since operators may have already deployed many WLAN APs. For user plane data delivery, 3GPP needs a new direct interface between the WLAN AP/AC and the eNB.

It is an FFS whether it is applicable to packet transfer or it is simply for an interface of only a CP, but the RAN 3 is conducting a study on a direct interface between the eNB and the WLAN side. According to the TR, an arrangement of a termination of the interface on the WLAN side is outside the scope of 3GPP. Therefore, either the AP or the AC can use Xw as the termination of the interface. In a case in which a termination function is mounted in the AC, the operator is able to effectively use the already deployed AP.

This architecture is similar to the 3C architecture of the DC. However, it should be noted that the WLAN is unable to have a special cell (such as the PSCell of the SeNB) since the UE is unable to transmit the PUCCH to the WLAN AP. In this regard, this scenario is similar to an RRH scenario of the CA rather than the DC.

Proposal 5: The RAN 2 should discuss whether or not to employ the non-collocated scenario in which the WLAN is connected to the MeNB via the RRH.

(Collocated in SeNB)

It is easy to imagine that the WLAN collocated in the small eNB will be common in the near future. In this scenario, it can be indicated as a simultaneous DC setting in which the collocated WLAN is used as an SCG cell. Since improvements in capacity and QoE are part of legitimation of this WI, it is worth considering if it is possible to set the DC and the LTE-WLAN aggregation simultaneously.

Proposal 6: The RAN 2 should discuss whether or not it is possible to configure the DC and the LTE-WLAN aggregation simultaneously.

If it is agreed to use simultaneous setting, then a method of offloading the bearer is unknown because there are several cases.

Case 1: The SCG bearer is split into WLANs.
Case 2: The PDCP is split into WLANs in the MeNB.
Case 3: The PDCP is split into the SCG LTE SCell and the WLAN in the MeNB.
Case 1: The SCG bearer is split into WLANs.

Figure 31:
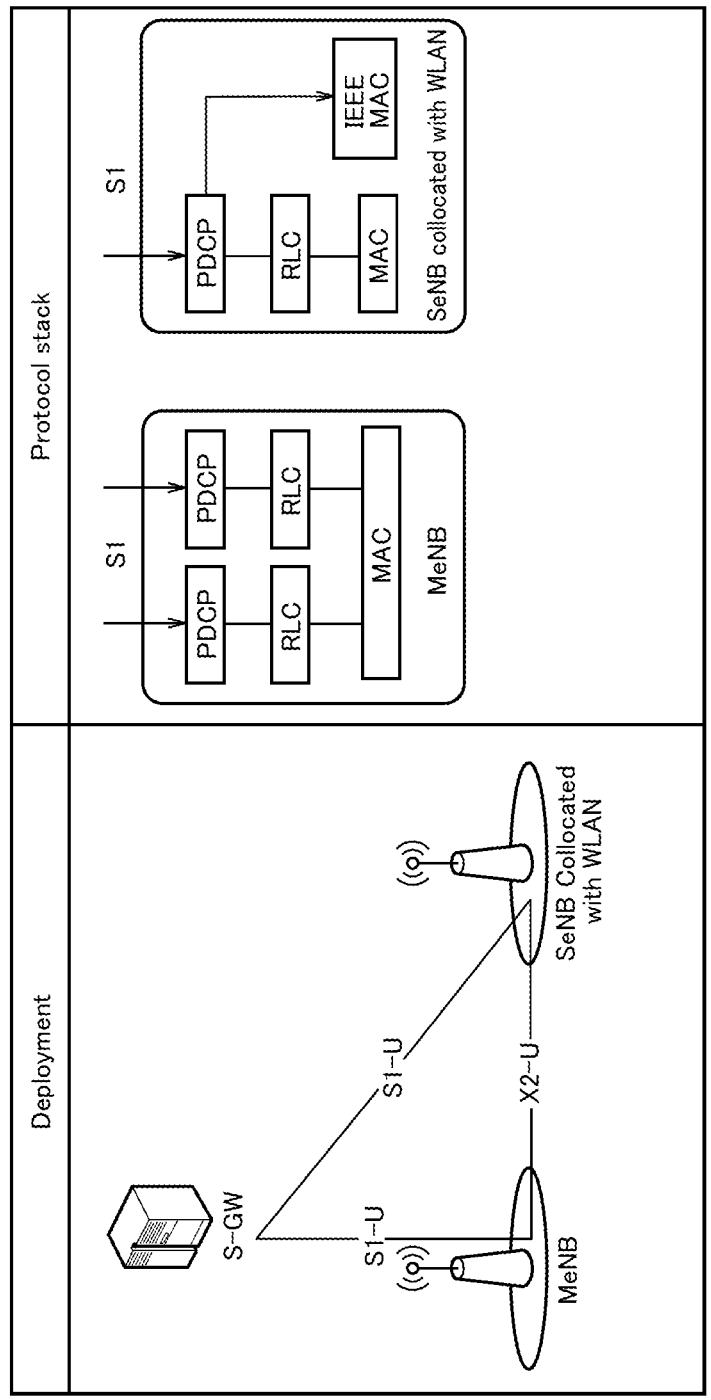
FIG. 31 is a diagram relating to an additional note.

FIG. 31: A case in which it is collocated in the SeNB, or the SCG bearer is split into WLANs.

In this case, the SCG bearer is delivered to the SCG-RLC and the IEEE MAC. The WLAN is used as the SCG serving cell. This is very similar to the "collocated in eNB" scenario.

Proposal 7: If it is agreed to use simultaneous setting, then it should also be agreed that the SCG bearer is split into WLANs as well.

Case 2: The PDCP is split into WLANs in the MeNB.

Figure 32:
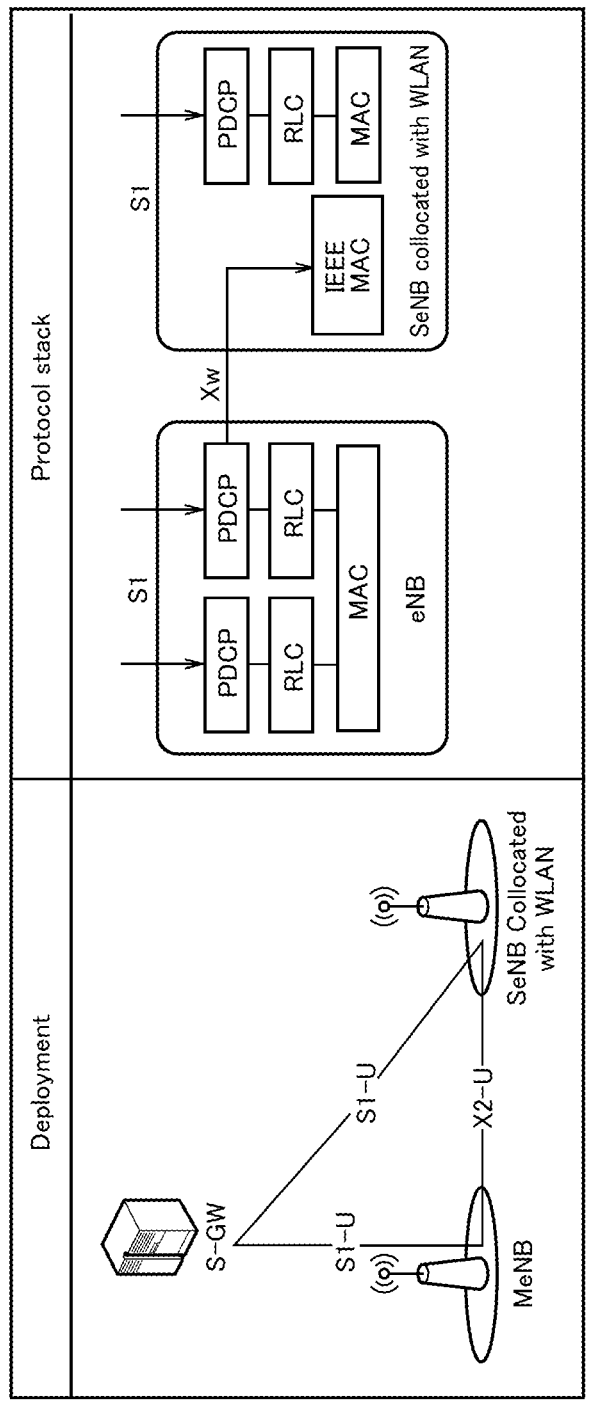
FIG. 32 is a diagram relating to an additional note.

FIG. 32: A case in which it is collocated in the SeNB, or the PDCP is split into WLANs. This case is very similar to the "non-collocated/connection with MeNB" scenario. The PDCP is split in the MeNB, and the PDU is transferred to the SeNB as Rel-12 DC, and it is transferred only to the IEEE MAC. Since the Xw interface is necessary, both the case 2 and the "non-collocated/connection with MeNB" is considered to be less desirable than the case 1 or 3.

Proposal 8: The RAN 2 should discuss whether or not the case in which it is collocated in the SeNB, or the PDCP is split into WLAN in the MeNB is agreed.

Case 3: The PDCP is split into the SCG LTE SCell and WLAN in the MeNB.

FIGS. 6A and 6B: A case in which it is collocated in the SeNB, or the PDCP is split into the SCG LTE SCell and the WLAN. When the RAN 2 considers the WLAN as one serving cell, then a method of allocating the split PDCP PDU depends on the scheduler of the SeNB. Part of the PDCP PDU delivered from the MeNB is routed to the SCG-RLC as the split bearer of the Rel-12 DC, and the other PDCP PDUs are routed to the IEEE MAC.

In this scenario, it is not clear which of the MeNB and the SeNB decides whether the PDCP PDU to be delivered is routed to the SCG-RLC or the IEEE MAC. If the MeNB makes the decision, the UE is able to be quasi-statically configured through the RRC message, but it is necessary to perform the RRC reconfiguration in order to change the routing.

On the other hand, if the SeNB decides the routing, there may be some advantages. The presence of the WLAN is transparent to the MCG, and the SeNB is able to dynamically route the delivered PDU to a SCell having a satisfactory radio state including the WLAN through its own scheduler.

Proposal 9: The RAN 2 should discuss whether the case in which it is collocated in SeNB, or the PDCP is split into the SCG LTE SCell and the WLAN in the MeNB is agreed.

Proposal 10: if the proposal 8 is agreed, the SeNB should decide whether the PDCP PDU is delivered to the RLC or the WLAN.

[Additional Note 2]

(1. Deployment Scenario and Architecture for WLAN Aggregation)

Figure 33:
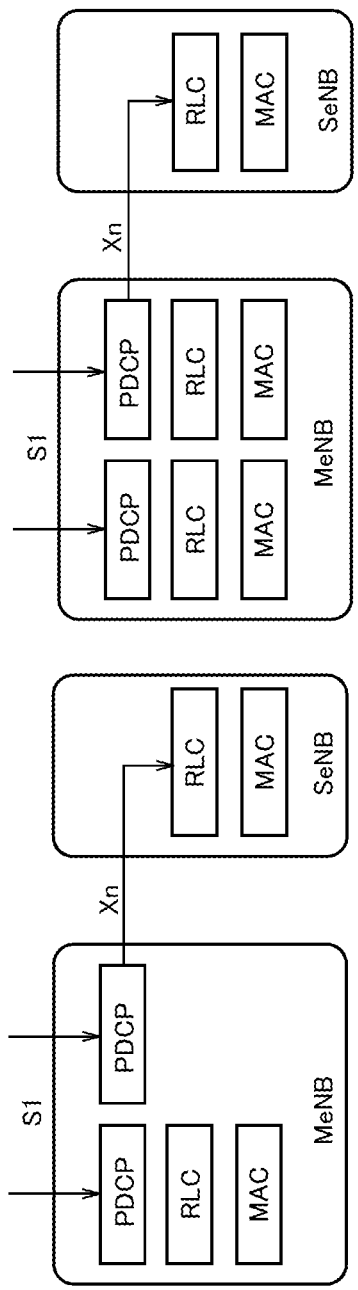
FIG. 33 is a diagram relating to an additional note.

Referring to FIG. 33, one of the objectivest of this WI is to standardize the RAN/WLAN protocol architecture of the LTE-WLAN aggregation on the UE and the network side on the basis of the LTE dual connectivity solutions 2C and 3C of the release 12.

(Function Specific to Solution 2C)
There is no LTE-RLC/LTE-MAC. As a result, it is considered to be difficult to control the QoS since there are no PBR, bucket, and logical channel.
Since the reordering function is not necessary, it is possible to set the unacknowledged data transfer (the UM type bearer) for this solution.

(Function Specific to Solution 3C)
The reordering function is necessary for both the eNB and the UE side.
A large buffer size for reordering the received PDCP PDUs is necessary.
For the same reason as in Rel-12 DC, the acknowledged data transfer (the AM type bearer) should be set for this solution.

(E-UTRAN User Plane for WLAN/3 GPP Aggregation)

This is a preliminary assumption of an overall architecture for the WLAN/3 GPP aggregation. As described in the WID, the WLAN aggregation should be transparent to the EPC. Therefore, the WLAN AP should be collocated in the eNB or directly connected to the eNB. It should not be considered to have other direct interfaces between the 3GPP nodes (for example, the S-GW and the MME).

Several deployment scenarios are able to be discussed.
1.1. Collocated in eNB
1.2. Non-collocated/connection with MeNB
1.3. Collocated in SeNB
1.4. Case of non-collocated/connection with MeNB
1.5. Case of non-collocated/connection with SeNB General Update for all Scenarios For all the deployment scenarios and the protocol stacks, the PDCP entity should supply the PDCP PDUs to the IEEE MAC layer. Since the IEEE MAC has no service for indicate successful delivery of the PDCP PDU, the RAN 2 should update the PDCP specification with no delivery success indication for the AM type bearer.

Unlike the CA and the DC, the PHY layer of IEEE is not allocated to the lower layer of the LTE-MAC. The RAN 2 should review several extensions of the activation/deactivation mechanism to efficiently reduce the battery consumption of the UE.

(2. Deployment Scenario and Architecture for Enhancing WLAN/3 GPP Interworking)

(1.1. Enhancement of Interworking Associated with S2 Interface)

The enhancement of the WLAN/3 GPP interworking is one of objects of this WI. We have requirements that a "solution for interworking enhancement should be constructed on LTE/WLAN interworking discussed in the release 12."

As a result of SI in Rel-12, traffic steering of the solution 3 is introduced as follows.

Step 3: traffic steering: If an ANDSF is not used, the RAN may need to know if an APN/bearer is offloaded or not so that the RAN can control the traffic routing. For example, the RAN needs a means for notifying the UE in accordance with it so that the UE is able to issue a binding update with a CN on the S2C. This affects signaling between the CN and the eNB as well as the operation of the UE between the AS level and the NAS level.

Figure 34:
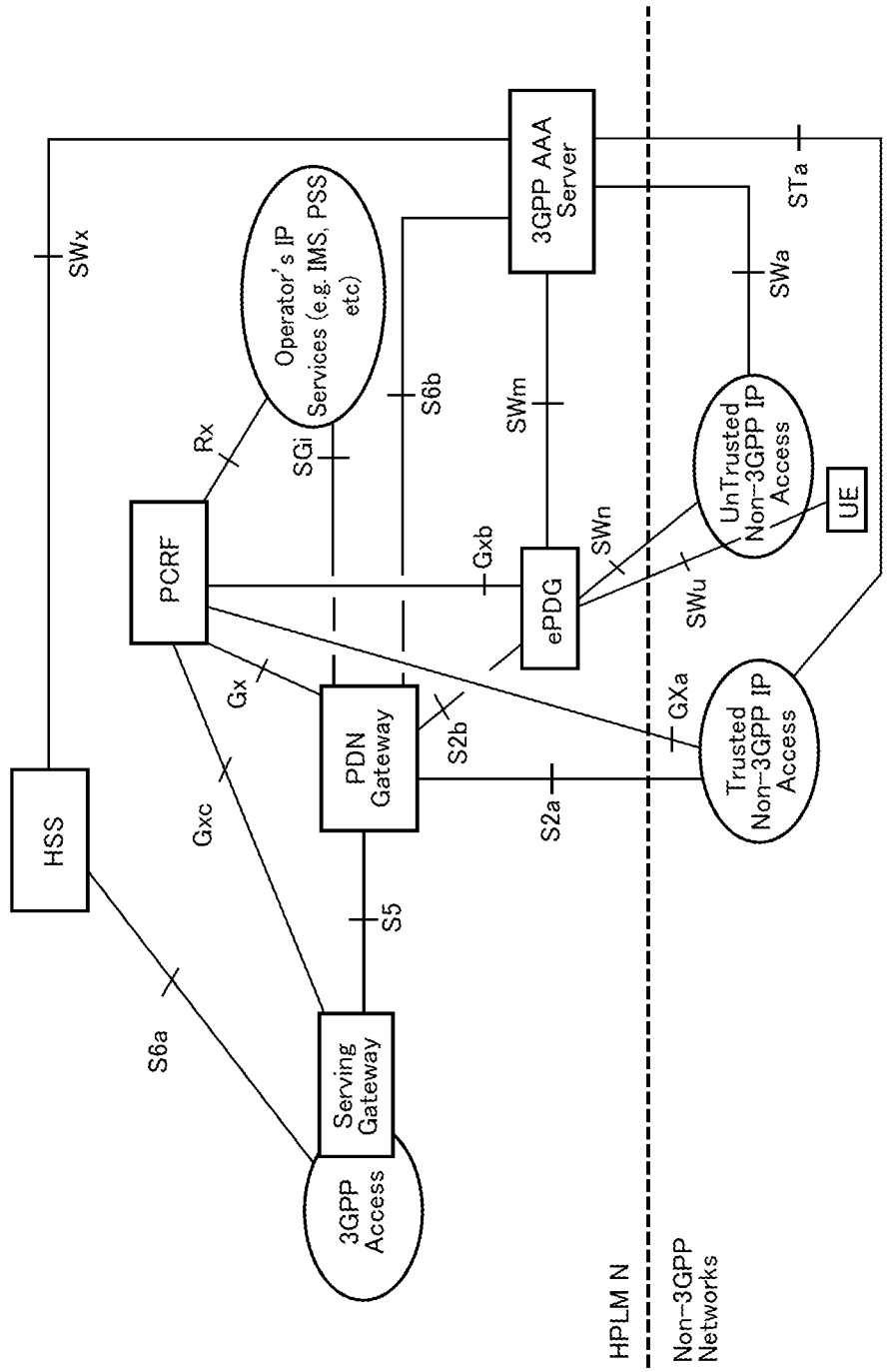
FIG. 34 is a diagram relating to an additional note.

Data is considered to be delivered via the S2 interface. It is simple to reuse the current CN architecture as in the Rel-12 WLAN/3 GPP Radio interworking. The current architecture is introduced in RP-150307, which can also be seen in FIG. 34.

(1.1.1 Coexistence of UE-Based WLAN Interworking of Rel-12)

The solution 3 being under review in Rel-12 is a network-based solution. On the other hand, Rel-12 interworking is a UE-based solution. We should study a priority in which an entity/function/rules/policy should decide traffic steering.

As a baseline, the ANDSF policy has a higher priority than the RAN rule. The AS layer in the UE simply transfers a result of RAN rule to the upper layer. The upper layer then decides a method of steering traffic to/from the WLAN.

In terms of compatibility, this method should be maintained. The interworking of Rel-13 should update a method in which the UE AS layer simply transfers the result to the upper layer. The RAN 2 should update a method in which the UE AS layer transfers RAN-related information to the upper layer.

In the interworking of Rel-12, an individual (dedicated) parameter is dealt with by the UE with a higher priority than a broadcast parameter. For the same reason, this priority should be reused in the interworking enhancement of Rel-13. Since the solution 3 can be applied to the UE in the RRC connected mode, and a steering command can be provided via the RRC message, the steering command in the interworking of Rel-13 should be dealt with as a higher priority than the result of RAN rule. Since the steering commands and both individual RAN auxiliary parameters are provided by the same eNB through an individual RRC messages, the steering command is not inconsistent with the result of RAN rule by the individual RAN auxiliary parameters.

The steering command in the interworking enhancement of the Rel-13 should be dealt with as a higher priority than the result of RAN rule.

FIG. 35 illustrates this existing scheme.

In the current specification of the RRC, the AS layer transfers information to the upper layer. This scheme should be maintained. In this regard, when the UE receives the steering command from the eNB, the UE should maintain the individual parameter and transfer the parameter to the upper layer in the same manner as in Rel-12. In the case in which the steering command is received from the eNB, the UE should maintain a dedicated parameter.

If the steering command is considered to be provided from the eNB through the RRC message, an RRC mechanism should be updated to notify the upper layer of the steering command.

For Example:

```
wlan-SteeringCommand ::= SEQUENCE {
   WLAN-Id-rl3 WLAN-Id-List-rl2,
   steeringState ENUMERATED {toLTE,toWLAN,null}
}
```

In a case in which the RRC Connection Reconfiguration message includes a WLAN-SteeringCommand, and the UE is able to conform to the configuration included in this message, the UE applies:

1> received steeringState.

1> WLAN-ID-List is transferred to the upper layer, and a notification indicating that the condition for steering traffic (to/from E-UTRAN from/to WLAN) in a time interval of T-SteeringWLAN for WLAN-ID-List is given to the upper layer.

The procedure in the idle mode should be changed to avoid a current operation while steeringState is toLTE or toWLAN.

(1.2. Interworking Enhancement Associated with Xw Interface)

Alternatively or additionally, it is possible to reuse the LTE-WLAN aggregation architecture for the interworking enhancement. The split bearer option is not assumed for the interworking enhancement. Therefore, the 3C option is deleted. On the other hand, the 2C option does not require the splitting/reordering function, and thus it is possible to reuse this option.

Figure 36:
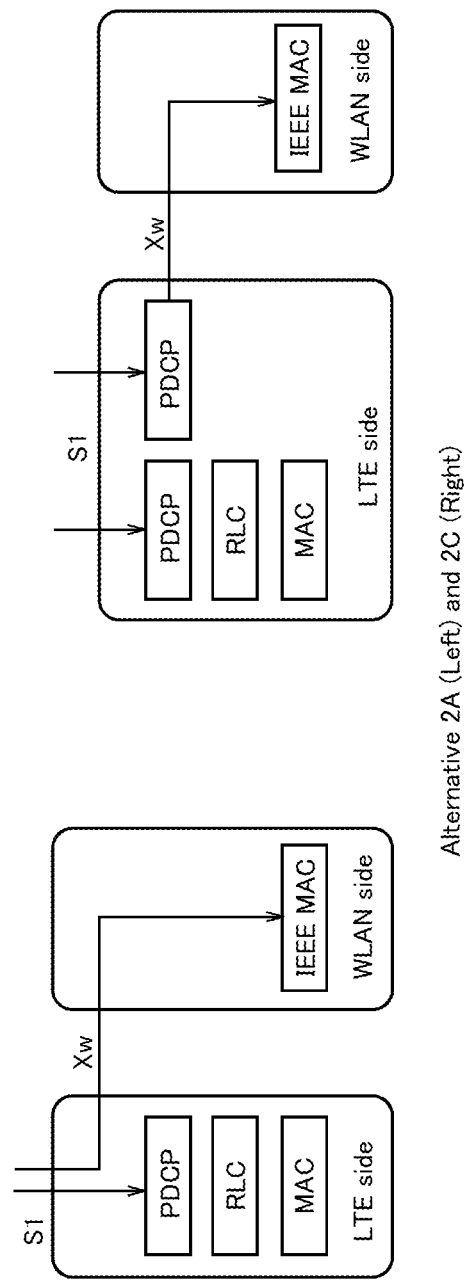
FIG. 36 is a diagram relating to an additional note.

Referring to FIG. 36, the RAN 2 is able to consider the 2C bearer option for WLAN interworking enhancement.

In addition to the 2C option, 2A can be considered to have less influence. In the 2A option, in the non-collocated scenario, the PDCP SDU (IP packet) is simply transferred to/from WLAN node through a direct interface. In the collocated scenario, the PDCP SDU is simply delivered within the eNB. This option does not require an additional function.

In a case in which the 2A option is agreed, the eNB-based traffic steering to/from the WLAN node can be performed. The traffic steering can be easily performed at a level finer than the APN level.

The RAN 2 can consider the 2A bearer option for the WLAN interworking enhancement (see FIG. 36).

For both the 2A and 2C scenarios in the WLAN interworking enhancement, the UE is able to trigger the traffic steering through the RRC message transmitted from the eNB. As a base line, it is possible to set both the AM type and the UM type. It is necessary to further review the simultaneous setting of FIGS. 2A and 2C. It is necessary to further review the change of the bearer type between 2A and 2C.

How is a packet loss to add or release the WLAN prevented?

The prevention of the packet loss in the 2C option can be performed, similarly to the WLAN aggregation. Since the PDCP entity allocates the PDCP SN to each packet, it is possible to perform loss checking. In a case in which the lower layer supports a function of a re-establishment method (as in the RLC), an existing mechanism is also reused. It is necessary to further review the prevention of the packet loss in the 2A option.

(3. Function Supported by IEEE MAC (Peer PDCP Entity Matter))

Since both the UE and the MeNB have the PDCP entity, the PDCP status report can be delivered between these two peer entities.

Both the PDCP status report and the PDCP data recovery are initiated by the upper layer (RRC) in accordance with to the current PDCP specification. The procedure for the PDCP status report is initiated when the RRC requests the PDCP re-establishment. The RRC requests the PDCP re-establishment in the case of the RRC connection re-establishment and the handover.

Here, the problem is considered to be the fact that there is no lower layer entity such as the RLC. In the PDCP specification, there is a section called "service expected from lower layer."

An acknowledged data transfer service including a PDCP PDU delivery success indication.

An unacknowledged data transfer service.

In-sequence delivery excluding the re-establishment of the lower layer.

Duplicate discarding excluding the re-establishment of the lower layer.

The IEEE MAC may not support these functions. The fact that the re-establishment is not supported is one of problems.

The RAN 2 can have two options to solve this problem.

Option 1: A service expected from the lower layer in the PDCP specification is changed.

Option 2: In the option 2, several new protocol layers (similar to an adapter) are generated between the PDCP and the IEEE MAC, and the new layers supports the service expected by the PDCP (for example, by monitoring the operation of the IEEE MAC). This new protocol is able to monitor and execute the handling of the QoS. This QoS process can be used for an additional request message transmitted from the eNB through the direct interface. This is similar to an E-RAB level QoS parameter process in which an SeNB addition request is performed.

In a case in which the lower layer is unable to support the in-sequence delivery, the PDCP is able to reorder the PDCP PDU/SDU even in the 2C bearer option.

WLAN Removal

The new protocol/function is able to monitor whether or not there is data on the WLAN side. In a case in which there is no data flow during a particular time interval, the UE is able to report it to the eNB. Then, the eNB deletes the WLAN (the eNB reconfigures the UE to delete a corresponding radio bearer). Although the WLAN is deleted (or deactivated), the UE is able to continuously measure the WLAN in accordance with the configuration.

The invention claimed is:

1. A base station in a system supporting wireless wide area network (WWAN)-wireless local area network (WLAN) aggregation communication in which a radio terminal performs communication using WWAN communication and WLAN communication simultaneously, the base station comprising:
    a controller configured to acquire a capability information message from the radio terminal that indicates a function of the radio terminal,
    wherein the capability information message comprises:
    a first information element indicating whether the radio terminal has a first function that splits a bearer of the radio terminal in a packet data convergence protocol (PDCP) layer of the WWAN communication for the WWAN-WLAN aggregation communication, and performs the WWAN-WLAN aggregation communication by using the WWAN communication and the WLAN communication for radio communication of the bearer, wherein the base station transmits a part of PDCP packets of the bearer to the radio terminal through the WLAN communication in the WWAN-WLAN aggregation communication, and
    a second information element indicating whether the radio terminal has a second function that uses only the WLAN communication for the radio communication of the bearer without splitting the bearer going through the PDCP layer of the WWAN communication, wherein the base station transmits PDCP packets of the bearer to the radio terminal through the WLAN communication.

2. The base station according to claim 1,
wherein an acknowledged mode and an unacknowledged mode are allowed in a bearer in which the second function is configured, and
only the acknowledged mode is allowed in a bearer in which the first function is configured.

3. The base station according to claim 1,
wherein the controller is further configured to set both the bearer in which the first function is configured and the bearer in which the second function is configured, to the radio terminal having both the first function and the second function.

4. The base station according to claim 1,
wherein the controller is further configured to perform a process of transmitting change information for changing a configuration of the bearer between the first function and the second function, to the radio terminal having both the first function and the second function.

5. The base station according to claim 4,
wherein, in a case in which the configuration of the bearer is changed from the second function to the first function, the controller is further configured to perform a process of transmitting configuration information for the first function together with the change information.

6. A radio terminal which is capable of performing wireless wide area network (WWAN)-wireless local area network (WLAN) aggregation communication of performing communication using WWAN communication and WLAN communication simultaneously, the radio terminal comprising:
    a controller configured to notify a base station of a capability information message indicating a function of the radio terminal,
    wherein the capability information message comprises:
    a first information element indicating whether the radio terminal has a first function that splits a bearer of the radio terminal in a packet data convergence protocol (PDCP) PDCP layer of the WWAN communication for the WWAN-WLAN aggregation communication, and performs the WWAN-WLAN aggregation communication by using the WWAN communication and the WLAN communication for radio communication of the bearer, wherein the radio terminal receives a part of PDCP packets of the bearer from the base station through the WLAN communication in the WWAN-WLAN aggregation communication, and
    a second information element indicating whether the radio terminal has a second function that uses only the WLAN communication for the radio communication of the bearer without splitting the bearer going through the PDCP layer, wherein the radio terminal receives PDCP packets of the bearer from the base station through the WLAN communication.

* * * * *

UNITED STATES PATENT AND TRADEMARK OFFICE
CERTIFICATE OF CORRECTION

PATENT NO. : 10,425,983 B2
APPLICATION NO. : 15/695165
DATED : September 24, 2019
INVENTOR(S) : Yushi Nagasaka et al.

Page 1 of 1

It is certified that error appears in the above-identified patent and that said Letters Patent is hereby corrected as shown below:

In the Claims

Column 42,
Line 43, Claim 6 delete "(PDCP) PDCP layer" and replace with -- (PDCP) layer --

Signed and Sealed this
Twenty-sixth Day of November, 2019

Andrei Iancu
*Director of the United States Patent and Trademark Office*